United States Patent [19]
Suzuki et al.

[11] Patent Number: 5,299,308
[45] Date of Patent: Mar. 29, 1994

[54] GRAPHIC DATA PROCESSING APPARATUS FOR PRODUCING A TONE FOR AN EDGE PIXEL AND REDUCING ALIASING EFFECTS

[75] Inventors: Hiroaki Suzuki, Yokohama; Naofumi Ueda, Urayasu, both of Japan

[73] Assignee: Ricoh Company, Ltd., Japan

[21] Appl. No.: 659,559

[22] Filed: Feb. 22, 1991

[30] Foreign Application Priority Data

| Feb. 28, 1990 | [JP] | Japan | 2-19566 |
| Jun. 22, 1990 | [JP] | Japan | 2-165079 |
| Jun. 22, 1990 | [JP] | Japan | 2-165080 |
| Jul. 30, 1990 | [JP] | Japan | 2-202190 |
| Jul. 30, 1990 | [JP] | Japan | 2-202191 |
| Nov. 13, 1990 | [JP] | Japan | 2-306710 |

[51] Int. Cl.$^5$ .............................. G06F 15/20
[52] U.S. Cl. ............................. 395/162; 358/456; 358/455; 395/109; 395/128
[58] Field of Search .......... 395/162, 128-132, 395/109; 340/730, 747, 748; 358/447, 455, 462, 450, 457, 461, 298, 448

[56] References Cited

U.S. PATENT DOCUMENTS

| 4,607,340 | 8/1986 | Nagai | 395/143 |
| 4,827,352 | 5/1989 | Yoneda et al. | 358/457 |
| 4,840,460 | 6/1989 | Bernot et al. | 359/55 |
| 4,908,780 | 3/1990 | Priem et al. | 395/135 |
| 4,965,672 | 10/1990 | Duke et al. | 358/298 |
| 5,012,257 | 4/1991 | Lowe et al. | 395/109 |
| 5,029,108 | 7/1991 | Lung | 395/109 |
| 5,086,484 | 2/1992 | Katayama et al. | 358/465 |
| 5,140,315 | 8/1992 | Edelson et al. | 340/744 |

FOREIGN PATENT DOCUMENTS

| 2223916 | 4/1990 | United Kingdom | 395/135 |

OTHER PUBLICATIONS

"Computer Graphics" by Hearn et al, Prentice Hall, 1986, pp. 91-92.

*Primary Examiner*—Dale M. Shaw
*Assistant Examiner*—Kee M. Tung
*Attorney, Agent, or Firm*—Mason, Fenwick & Lawrence

[57] ABSTRACT

The tones (or densities) of individual edge pixels of vector data are determined by first dividing each edge pixel into subpixels, after which the thus-determined tones are fed to a laser printer or other output unit. Advantageously, the present invention smooths jagged edges by performing an anti-aliasing process. To achieve this smoothing of graphic data, any of a variety of filters, each having particular weights, are used for the process of dividing edge pixels into subpixels.

13 Claims, 49 Drawing Sheets

CONE FILTER

| 2 | 4 | 5 | 6 | 5 | 4 | 2 |
|---|---|---|---|---|---|---|
| 4 | 6 | 8 | 9 | 8 | 6 | 4 |
| 5 | 8 | 11 | 12 | 11 | 8 | 5 |
| 6 | 9 | 12 | 16 | 12 | 9 | 6 |
| 5 | 8 | 11 | 12 | 11 | 8 | 5 |
| 4 | 6 | 8 | 9 | 8 | 6 | 4 |
| 2 | 4 | 5 | 6 | 5 | 4 | 2 |

CYLINDRICAL FILTER

| 1 | 1 | 1 | 1 | 1 | 1 |
|---|---|---|---|---|---|
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |

CONE FILTER

| 1 | 3 | 4 | 4 | 3 | 1 |
|---|---|---|---|---|---|
| 3 | 5 | 6 | 6 | 4 | 3 |
| 4 | 6 | 9 | 9 | 6 | 4 |
| 4 | 6 | 9 | 9 | 6 | 4 |
| 3 | 5 | 6 | 6 | 4 | 3 |
| 1 | 3 | 4 | 4 | 3 | 1 |

GAUSSIAN FILTER

| 2 | 3 | 4 | 4 | 3 | 2 |
|---|---|---|---|---|---|
| 3 | 5 | 6 | 6 | 5 | 3 |
| 4 | 7 | 9 | 9 | 7 | 4 |
| 4 | 7 | 9 | 9 | 7 | 4 |
| 3 | 5 | 6 | 6 | 5 | 3 |
| 2 | 3 | 4 | 4 | 3 | 2 |

HAMMING FILTER

| 1 | 3 | 4 | 4 | 3 | 1 |
|---|---|---|---|---|---|
| 3 | 5 | 6 | 6 | 5 | 3 |
| 4 | 6 | 9 | 9 | 6 | 4 |
| 4 | 6 | 9 | 9 | 6 | 4 |
| 3 | 5 | 6 | 6 | 5 | 3 |
| 1 | 3 | 4 | 4 | 3 | 1 |

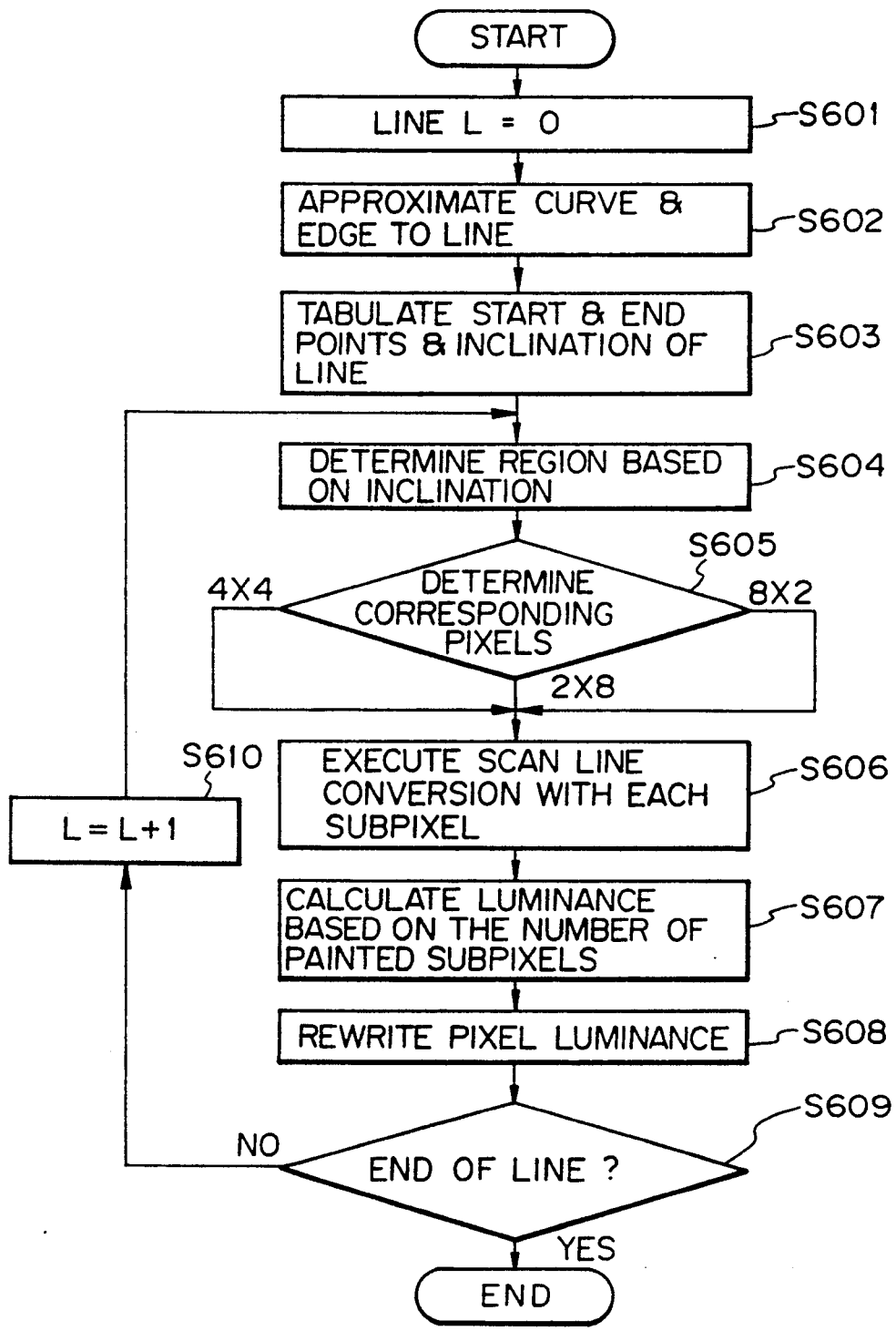

1*9 SUBMATRIX

9*1 SUBMATRIX

3*3 SUBMATRIX

Fig. 21

| 0 | 0 | 0 | 0 | 0 | 0 | 0 | 0 | 0 |
|---|---|---|---|---|---|---|---|---|
| 0 | 0 | 0 | 1 | 2 | 3 | 4 | 6 | 0 |
| 0 | 3 | 9 | 9 | 9 | 9 | 9 | 6 | 0 |
| 0 | 1 | 9 | 9 | 9 | 9 | 9 | 5 | 0 |
| 0 | 0 | 9 | 9 | 9 | 9 | 9 | 4 | 0 |
| 0 | 0 | 9 | 7 | 6 | 5 | 5 | 3 | 0 |
| 0 | 0 | 0 | 0 | 0 | 0 | 0 | 0 | 0 |

Fig. 22A

| 0 | 0 | 0 | 0 | 0 | 0 | 0 | 0 | 0 |
|---|---|---|---|---|---|---|---|---|
| 0 | 0 | 0 | 0 | 1 | 1 | 1 | 2 | 0 |
| 0 | 1 | 3 | 3 | 3 | 3 | 3 | 2 | 0 |
| 0 | 0 | 3 | 3 | 3 | 3 | 3 | 2 | 0 |
| 0 | 0 | 3 | 3 | 3 | 3 | 3 | 1 | 0 |
| 0 | 0 | 3 | 2 | 2 | 2 | 2 | 1 | 0 |
| 0 | 0 | 0 | 0 | 0 | 0 | 0 | 0 | 0 |

Fig. 22B

| 0 | 0 | 0 | 0 | 0 | 0 | 0 | 0 | 0 |
|---|---|---|---|---|---|---|---|---|
| 0 | 0 | 0 | 1 | 1 | 2 | 3 | 4 | 0 |
| 0 | 2 | 6 | 6 | 6 | 6 | 6 | 4 | 0 |
| 0 | 1 | 6 | 6 | 6 | 6 | 6 | 3 | 0 |
| 0 | 0 | 6 | 6 | 6 | 6 | 6 | 3 | 0 |
| 0 | 0 | 6 | 5 | 4 | 3 | 3 | 2 | 0 |
| 0 | 0 | 0 | 0 | 0 | 0 | 0 | 0 | 0 |

Fig. 22C

| 0 | 0 | 0 | 0 | 0 | 0 | 0 | 0 | 0 |
|---|---|---|---|---|---|---|---|---|
| 0 | 0 | 0 | 1 | 0 | 1 | 1 | 1 | 0 |
| 0 | 1 | 2 | 2 | 2 | 2 | 1 | 0 |
| 0 | 1 | 2 | 2 | 2 | 2 | 2 | 1 | 0 |
| 0 | 0 | 2 | 2 | 2 | 2 | 2 | 1 | 0 |
| 0 | 0 | 2 | 2 | 1 | 1 | 1 | 1 | 0 |
| 0 | 0 | 0 | 0 | 0 | 0 | 0 | 0 | 0 |

Fig. 22D

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

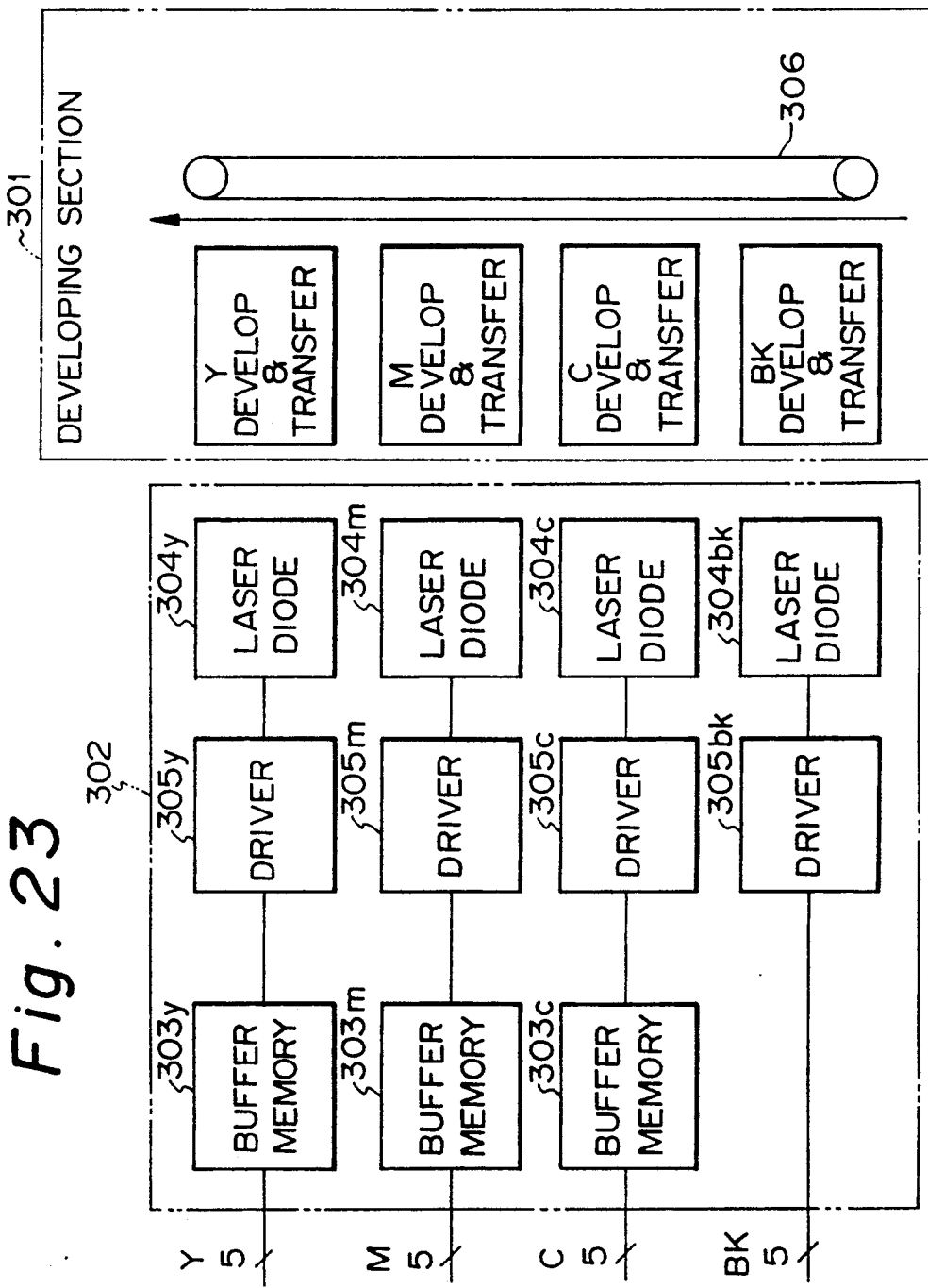

Fig. 32

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 5 | 2 | 0 | 0 | 0 | 0 | 0 | 0 |
| 0 | 0 | 0 | 8 | 9 | 9 | 8 | 7 | 5 | 0 | 0 | 0 |
| 0 | 0 | 8 | 9 | 9 | 9 | 9 | 9 | 9 | 3 | 0 | 0 |
| 0 | 6 | 9 | 9 | 9 | 9 | 9 | 9 | 8 | 0 | 0 | 0 |
| 0 | 4 | 9 | 9 | 9 | 9 | 9 | 9 | 4 | 0 | 0 | 0 |
| 0 | 0 | 9 | 9 | 9 | 9 | 9 | 7 | 5 | 0 | 0 | 0 |
| 0 | 0 | 5 | 4 | 3 | 1 | 0 | 0 | 0 | 0 | 0 | 0 |
| 0 | 0 | 0 | 0 | 0 | 0 | 0 | 0 | 0 | 0 | 0 | 0 |

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 5 | 2 | 0 | 0 | 0 | 0 | 0 | 0 |
| 0 | 0 | 0 | 8 | 9 | 9 | 8 | 7 | 5 | 0 | 0 | 0 |
| 0 | 0 | 8 | 9 | 9 | 9 | 9 | 9 | 9 | 9 | 3 | 0 |
| 0 | 6 | 9 | 9 | 9 | 9 | 9 | 9 | 9 | 8 | 0 | 0 |
| 0 | 4 | 9 | 9 | 9 | 9 | 9 | 9 | 9 | 4 | 0 | 0 |
| 0 | 0 | 9 | 9 | 9 | 9 | 9 | 7 | 5 | 0 | 0 | 0 |
| 0 | 0 | 5 | 4 | 3 | 1 | 0 | 0 | 0 | 0 | 0 | 0 |
| 0 | 0 | 0 | 0 | 0 | 0 | 0 | 0 | 0 | 0 | 0 | 0 |

Fig. 39A

| 0 | 0 | 0 | 0 | 0 | 0 | 0 | 0 | 0 | 0 |
|---|---|---|---|---|---|---|---|---|---|
| 0 | 0 | 0 | 0 | 2 | 1 | 0 | 0 | 0 | 0 |
| 0 | 0 | 0 | 2 | 3 | 3 | 2 | 2 | 0 | 0 |
| 0 | 0 | 2 | 3 | 3 | 3 | 3 | 3 | 1 | 0 |
| 0 | 2 | 3 | 3 | 3 | 3 | 3 | 3 | 2 | 0 |
| 0 | 1 | 3 | 3 | 3 | 3 | 3 | 3 | 1 | 0 |
| 0 | 0 | 3 | 3 | 3 | 3 | 2 | 2 | 0 | 0 |
| 0 | 0 | 2 | 1 | 1 | 0 | 0 | 0 | 0 | 0 |
| 0 | 0 | 0 | 0 | 0 | 0 | 0 | 0 | 0 | 0 |

Fig. 39B

| 0 | 0 | 0 | 0 | 0 | 0 | 0 | 0 | 0 | 0 |
|---|---|---|---|---|---|---|---|---|---|
| 0 | 0 | 0 | 0 | 3 | 1 | 0 | 0 | 0 | 0 |
| 0 | 0 | 0 | 6 | 6 | 6 | 7 | 5 | 3 | 0 |
| 0 | 0 | 0 | 6 | 6 | 6 | 6 | 6 | 6 | 2 | 0 |
| 0 | 4 | 6 | 6 | 6 | 6 | 6 | 6 | 0 | 0 |
| 0 | 3 | 6 | 6 | 6 | 6 | 6 | 6 | 3 | 0 |
| 0 | 0 | 6 | 6 | 6 | 6 | 5 | 3 | 0 | 0 |
| 0 | 0 | 3 | 3 | 2 | 1 | 0 | 0 | 0 | 0 |
| 0 | 0 | 0 | 0 | 0 | 0 | 0 | 0 | 0 | 0 |

Fig. 39C

| 0 | 0 | 0 | 0 | 0 | 0 | 0 | 0 | 0 | 0 |
|---|---|---|---|---|---|---|---|---|---|
| 0 | 0 | 0 | 0 | 1 | 0 | 0 | 0 | 0 | 0 |
| 0 | 0 | 0 | 2 | 2 | 2 | 2 | 1 | 0 | 0 |
| 0 | 0 | 2 | 2 | 2 | 2 | 2 | 2 | 1 | 0 |
| 0 | 1 | 2 | 2 | 2 | 2 | 2 | 2 | 0 | 0 |
| 0 | 1 | 2 | 2 | 2 | 2 | 2 | 1 | 0 | 0 |
| 0 | 0 | 2 | 2 | 2 | 2 | 1 | 1 | 0 | 0 |
| 0 | 0 | 1 | 1 | 1 | 0 | 0 | 0 | 0 | 0 |
| 0 | 0 | 0 | 0 | 0 | 0 | 0 | 0 | 0 | 0 |

Fig. 39D

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

Fig. 41A

| 1 | 1 | 1 | 1 |
|---|---|---|---|
| 1 | 1 | 1 | 1 |
| 1 | 1 | 1 | 1 |
| 1 | 1 | 1 | 1 |

Fig. 41B

| 3 | 2 | 1 | 0 |
|---|---|---|---|
| 3 | 1 | 0 | 0 |
| 3 | 1 | 0 | 0 |
| 3 | 2 | 1 | 0 |

Fig. 41C

| 3 | 3 | 2 | 2 |
|---|---|---|---|
| 3 | 2 | 1 | 1 |
| 0 | 1 | 1 | 0 |
| 0 | 0 | 0 | 0 |

Fig. 41D

| 0 | 0 | 0 | 0 |
|---|---|---|---|
| 0 | 1 | 1 | 0 |
| 1 | 1 | 2 | 3 |
| 2 | 2 | 3 | 3 |

Fig. 41E

| VECTOR DATA INCLINATION | KIND OF EDGE | DECISION | FILTER |
|---|---|---|---|
| $0 \leq a < \pi/4$ | LEFT EDGE | PAINT LOWER PART OF EDGE PIXEL | USE FILTER FOR UPPER EDGE |
| $-\pi/4 < a < 0$ | RIGHT EDGE | | |
| $0 \leq a < \pi/4$ | RIGHT EDGE | PAINT UPPER PART OF EDGE PIXEL | USE FILTER FOR LOWER EDGE |
| $-\pi/4 < a < 0$ | LEFT EDGE | | |
| $\pi/4 \leq a \leq \pi/2$ | LEFT EDGE | PAINT RIGHT PART OF EDGE PIXEL | USE FILTER FOR LEFT EDGE |
| $-\pi/2 \leq a \leq -\pi/4$ | | | |
| $\pi/4 \leq a \leq \pi/2$ | RIGHT EDGE | PAINT LEFT PART OF EDGE PIXEL | USE FILTER FOR RIGHT EDGE |
| $-\pi/2 \leq a \leq -\pi/4$ | | | |

Fig. 43

| 0 | 0 | 0 | 0 | 0 | 0 | 0 | 0 | 0 | 0 | 0 |
|---|---|---|---|---|---|---|---|---|---|---|
| 0 | 0 | 0 | 0 | 1 | 0 | 0 | 0 | 0 | 0 | 0 |
| 0 | 0 | 0 | 3 | 9 | 8 | 3 | 0 | 0 | 0 | 0 |
| 0 | 0 | 3 | 9 | 9 | 9 | 9 | 9 | 9 | 8 | 4 | 0 |
| 0 | 0 | 9 | 9 | 9 | 9 | 9 | 9 | 9 | 9 | 0 | 0 |
| 0 | 0 | 9 | 9 | 9 | 9 | 9 | 9 | 9 | 5 | 0 | 0 |
| 0 | 0 | 6 | 9 | 9 | 9 | 8 | 5 | 4 | 0 | 0 | 0 |
| 0 | 0 | 0 | 1 | 0 | 0 | 0 | 0 | 0 | 0 | 0 |
| 0 | 0 | 0 | 0 | 0 | 0 | 0 | 0 | 0 | 0 | 0 |

Fig. 44A

|0|0|0|0|0|0|0|0|0|0|
|---|---|---|---|---|---|---|---|---|---|
|0|0|0|0|0|0|0|0|0|0|
|0|0|0|1|3|3|1|0|0|0|
|0|0|1|3|3|3|3|3|3|1|0|
|0|0|3|3|3|3|3|3|3|0|0|
|0|0|3|3|3|3|3|3|2|0|0|
|0|0|2|3|3|3|2|1|0|0|0|
|0|0|0|0|0|0|0|0|0|0|
|0|0|0|0|0|0|0|0|0|0|

Fig. 44B

|0|0|0|0|0|0|0|0|0|0|
|---|---|---|---|---|---|---|---|---|---|
|0|0|0|0|1|0|0|0|0|0|
|0|0|0|2|6|5|2|0|0|0|
|0|0|2|6|6|6|6|6|5|3|0|
|0|0|6|6|6|6|6|6|6|0|0|
|0|0|6|6|6|6|6|6|3|0|0|
|0|0|4|6|6|5|3|3|0|0|0|
|0|0|0|1|0|0|0|0|0|0|
|0|0|0|0|0|0|0|0|0|0|

Fig. 44C

|0|0|0|0|0|0|0|0|0|0|
|---|---|---|---|---|---|---|---|---|---|
|0|0|0|0|1|0|0|0|0|0|
|0|0|0|1|2|1|1|0|0|0|
|0|0|1|2|2|2|2|2|1|1|0|
|0|0|2|2|2|2|2|2|2|0|0|
|0|0|2|2|2|2|2|2|1|0|0|
|0|0|1|2|2|1|1|1|0|0|0|
|0|0|0|1|0|0|0|0|0|0|
|0|0|0|0|0|0|0|0|0|0|

Fig. 44D

|0|0|0|0|0|0|0|0|0|0|
|---|---|---|---|---|---|---|---|---|---|
|0|0|0|0|0|0|0|0|0|0|
|0|0|0|0|0|0|0|0|0|0|
|0|0|0|0|0|0|0|0|0|0|
|0|0|0|0|0|0|0|0|0|0|
|0|0|0|0|0|0|0|0|0|0|
|0|0|0|0|0|0|0|0|0|0|
|0|0|0|0|0|0|0|0|0|0|
|0|0|0|0|0|0|0|0|0|0|

GRAPHIC DATA PROCESSING APPARATUS FOR PRODUCING A TONE FOR AN EDGE PIXEL AND REDUCING ALIASING EFFECTS

BACKGROUND OF THE INVENTION

The present invention relates to a graphic data processing apparatus for removing the jags of edges included in vector data and, more particularly, to a graphic data processing apparatus for determining the tones (densities) of edge pixels of vector data and feeding the determined tones to a laser printer or similar output unit.

It is a common practice with computer graphics to execute antialiasing which allows an image to appear more attractive on a CRT (Cathode Ray Tube). Conventional approaches for implementing antialiasing include (1) an uniform averaging method, (2) a weighted averaging method (2) and (3) a convolutional integration method.

With the advance of so-called DTP (Desk Top Publishing) using a personal computer, systems of the type printing out vector images similar to those which are handled by the computer graphics art are extensively used today. Typical of such systems is one using Postscript of Adbi. Postscript belongs to a family of languages usually referred to as PDLs (Page Description Languages). PDL is a programming language for describing a form representative of the contents of one document including the text, graphics, and their arrangement and format. Regarding a character font, this type of system is implemented with a vector font. Hence, even when the text is changed in magnification, this system prints it out in far higher quality than a system which uses a bit map font (e.g. conventional word processor). Another advantage particular to the above-stated system is that both the character font and the graphics can be printed out in combination.

However, a laser printer applicable to such a system has a resolution which is not higher than 240 dpi to 400 dpi and, like CRT of computer graphics, suffers from alias. It is, therefore, necessary to provide even the laser printer type printing with an antialias implementation so as to produce high quality images.

When a conventional graphic data processing apparatus is implemented with antialiasing which uses N×N subpixel devision, it cannot achieve sufficient effects since it uses only moderate N from the standpoint of processing time and subjective evaluation of image quality. Specifically, excessively great N would increase the calculating time while excessively small N would limit the effect.

A conventional graphic data processing apparatus using the uniform averaging scheme uses only one kind of subpixel configuration such as N * M submatix in calculating the tone (luminance and density) of a pixel. This brings about a problem that, depending on the inclination of vector data, the tone produced from the actual image and the tone produced from the subpixel configuration greatly differ from each other, resulting in insufficient antialiasing.

A graphic data processing apparatus implemented by the weighted averaging scheme or the convolutional integration scheme is advantageous over the apparatus implemented by the uniform averaging scheme since it reduces the difference between the tone derived from the actual area and the tone derived from the subpixel configuration and thereby enhancing the antialiasing effect. Such an apparatus, however, consumes a substantial period of time in calculating the area ratio and, therefore, slows down the processing.

Moreover, in a graphic data processing apparatus provided with any one of the conventional antialiasing schemes, despite that a laser printer which outputs an image by electrophotographic process is substituted for CRT which plays the role of an output unit, the luminance of CRT is simply replaced with the density of the laser printer. This is undesirable since the characteristic particular to an electrophotographic process prevents the antialiasing effect from being fully exhibited.

SUMMARY OF THE INVENTION

It is therefore an object of the present invention to enhance the antialising effect.

It is another object of the present invention to produce a tone not greatly different from a tone derived from the actual area ratio without slowing down the processing.

It is another object of the present invention to insure the antialiasing effect by taking account of the characteristic of an electrophotographic process.

It is still another object of the present invention to prevent low-density dots ascribable to the characteristic of a pulse width modulation system from degrading the antialiasing effect, without reducing the processing rate.

It is a further object of the present invention to eliminate aliasing due to low-density dots without reducing the accuracy of antialiasing.

In accordance with the present invention, a graphic data processing apparatus for producing a tone of an edge pixel of vector data comprises a dividing section for dividing an edge pixel of vector data into subpixels, and a varying section for varying a configuration in which the dividing section divides an edge pixel.

Also, in accordance with the present invention, a graphic data processing apparatus for producing a tone of an edge pixel of vector data comprises a dividing section for dividing an edge pixel of vector data into subpixels, and a varying section for varying a size in which the dividing section divides an edge pixel into subpixels by approximating the vector data to a line vector and on the basis of an inclination of the line vector.

Further, a graphic data processing apparatus for determining a tone (density) of an edge pixel of vector data by dividing the edge pixel into subpixels and outputting the tone, the present invention selects, among a plurality of subpixel configurations, a particular subpixel configuration on the basis of whether or not a marginal point exists in the edge pixel, and divides the edge pixel divided into subpixels in the particular subpixel configuration.

Yet, in accordance with the present invention, a graphic data processing apparatus for producing a tone of an edge pixel of vector data comprises a dividing section for dividing an edge pixel of vector data, and a tone determining section for transforming, when an edge pixel is divided in a left-and-right direction, the area of a right portion into a tone by a greater contribution ratio than the area of a left portion.

Furthermore, in accordance with the present invention, a graphic data processing apparatus for producing a tone of an edge pixel of vector data comprises a dividing section for dividing an edge pixel into subpixels, and a tone determining section for determining a tone of an edge pixel by dividing the edge pixel into a division region which is to be divided into subpixels and a non-division region which is not to be divided into subpixels and on the basis of the number of subpixels of the division region which are covered by an image.

In addition, in accordance with the present invention, a graphic data processing apparatus for producing a tone of an edge pixel of vector data comprises a dividing section for dividing an edge pixel of vector data into subpixels, a deciding section for determining, on the basis of an inclination of vector data traversing an edge pixel and the kind of an edge, which of upper, lower, left and right portions of the edge pixel an image to be painted is positioned, storing means for storing a first, a second, a third and a fourth weighting filter to be used when the image to be painted is positioned in the upper portion, lower portion, right portion, and left portion of the edge pixel, respectively, and a tone determining section for determining a tone of the edge pixel by selecting, on the basis of the result of decision by the deciding means, one of the first to fourth weighting filters matching the result of decision.

BRIEF DESCRIPTION OF THE DRAWINGS

The above and other objects, features and advantages of the present invention will become more apparent from the following detailed description taken with the accompanying drawings in which:

FIG. 13 is a flowchart demonstrating a specific operation of the embodiment;

FIG. 21 shows tones undergone antialiasing processing;

FIGS. 22A to 22D show Y, M, C and BK image data written to plain memory sections of a page memory;

FIG. 23 is a block diagram schematically showing a control system of a multi-level color laser printer;

FIG. 32 shows tones produced by the processing particular to the third embodiment;

FIGS. 33A to 33D show Y, M, C and BK image data written to plain memory sections of a page memory in the third embodiment;

FIG. 38 shows tones undergone the processing of FIG. 4;

FIGS. 39A to 39D show Y, M, C and BK image data written to plain memory sections of a page memory in the fourth embodiment;

FIGS. 41A to 41F show antialiasing particular to a fifth embodiment;

FIG. 43 shows tones resulted from the processing particular to the fifth embodiment;

FIGS. 44A to 44D show Y, M, C and BK image data written to plain memory sections of a page memory in the fifth embodiment.

DESCRIPTION OF THE PREFERRED EMBODIMENTS

To better understand the present invention, conventional graphic data processing technologies will be described.

Figure 1A:
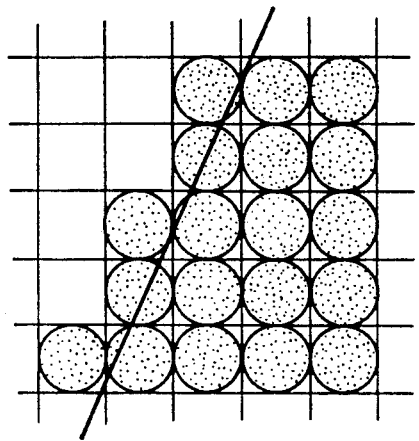
FIGS. 1A and 1B show conventional antialiasing.
Figure 1B:
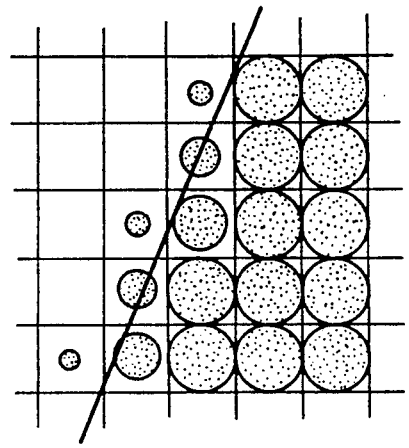

FIG. 1A shows a specific image appearing on CRT for computer graphics and having jagged edges (generally referred to as "alias"), while FIG. 1B shows the image whose alias has undergone luminance modulation to appear smoother and more attractive. Antialiasing approaches available with conventional graphic data processing are (1) uniform averaging, (2) weighted averaging, and (3) convolutional integration, as stated earlier.

Figure 2A:
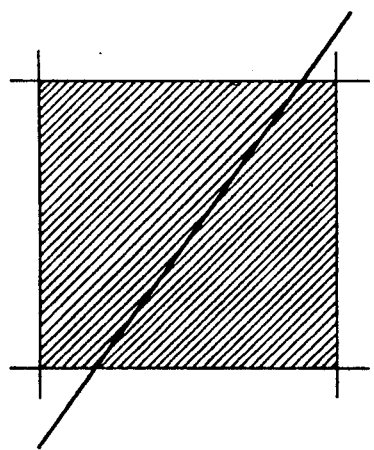
FIGS. 2A and 2B show antialiasing implemented by a uniform averaging scheme.
Figure 2B:
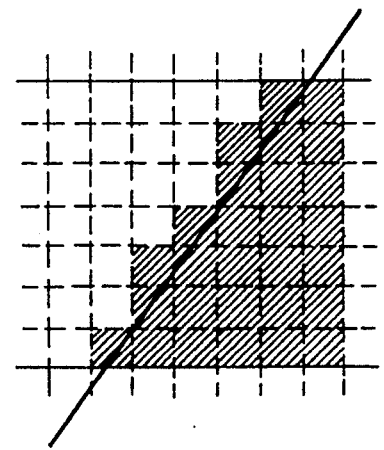

The averaging scheme decomposes each pixel into N * M (both being natural numbers) subpixels, effects raster calculation at high resolution, and then determines the luminance of each pixel by averaging the N * M subpixels. A reference will be made to FIGS. 2A and 2B for describing the uniform averaging scheme specifically. As shown, assume that the edge of of an image traverses a certain pixel (in the figure, the image extends rightward and downward from the oblique line). Then, if antialiase processing is not executed, the maximum displayable luminance (e.g. kid=255 in the case of 256 tones) is assigned to the pixel of interest, as shown in FIG. 2A. When N=M=7 averaging, for example, is used to implement antialiasing, the pixel of interest is divided into 7 * 7 subpixels, as shown in FIG. 2B. The subpixels in which the image exists are counted. The number of such subpixels (twenty-eight) is divided by the total number of subpixels (forty-nine in this case) for standardization (averaging). The maximum luminance (255) is multiplied by the result of division to produce a luminance of the pixel of interest. In this manner, this particular approach determines the luminance of a pixel by taking account of how the image is associated therewith.

Figures 3A, 3B, 4A, 4B:
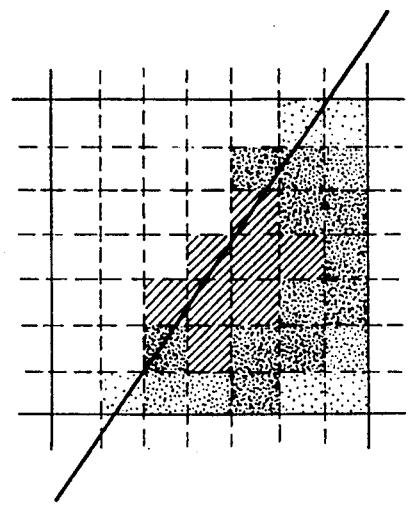
FIGS. 3A and 3B show antialiasing using a weighted averaging scheme.
FIGS. 4A to 4D show specific filters applicable to the weighted averaging scheme.

The weighted averaging approach is a modified version of the uniform averaging approach. While the uniform averaging scheme treats all the subpixels of a single pixel by using the same weight, i.e., it simply counts the subpixels covered by an image, the weighted averaging approach assigns a particular weight to each subpixel so that the influence on the luminance kid may depend on which subpixels are covered by an image. The weights are provided by a filter. FIG. 3A shows a specific filter (here, cone filter) characteristic for implementing the weighted averaging scheme. Assume that the weighted averaging scheme is executed with the image data shown in FIG. 2A and by using the N=M=7 division. The weights of the filter are applied to corresponding subpixels which constitute a single pixel. For example, the subpixel positioned at the upper right corner is "2". When all the subpixels are covered by an image, the weight provided by the filter characteristic is the count of a subpixel. FIG. 3B shows a displayed image pattern which is associated with the different weights of the subpixels shown in FIG. 3A. In this case, 199 subpixels are covered by an image. The number of such subpixels is divided by the sum of the values of the filter (here 336) as in the uniform averaging scheme, and the maximum luminance is multiplied by the result of division to produce the luminance of the pixel of interest. FIGS. 4A to 4D show specific filters for implementing the above procedure.

Figures 4C, 4D, 5:
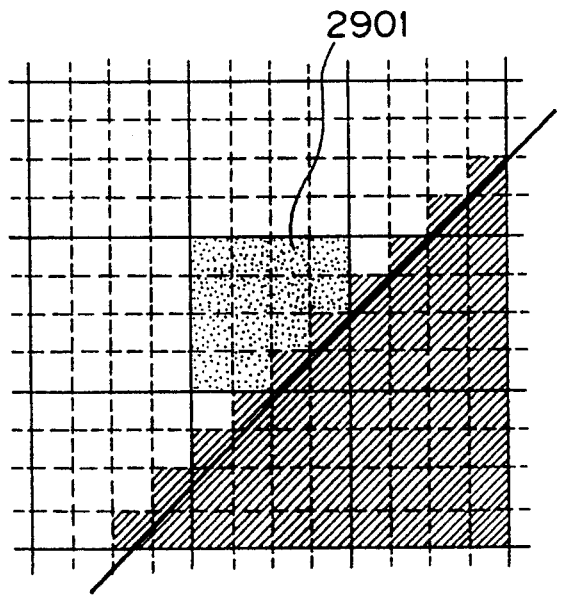
FIG. 5 shows a convolutional integration scheme using a 3×3 pixel division.

The convolution integration scheme determines the luminance of a given pixel while referencing surrounding pixels. Specifically, this scheme considers N'×N' pixels next to and surrounding a pixel whose luminance should be determined as pixels which correspond to those of the uniform averaging scheme or the weighted averaging scheme. FIG. 5 shows the convolutional integration scheme which referencences 3×3 pixels by way of example. In the figure, the pixel whose luminance should be determined is designated by the reference numeral 2901. An image extends rightward an downward from the oblique line, and smeared subpixels are counted. Each pixel is divided into a 4*4 matrix. In this case, therefore, use is made of a 12*12 filter. This kind of method is successful in removing high-frequency components from a vector image.

Figure 6A:
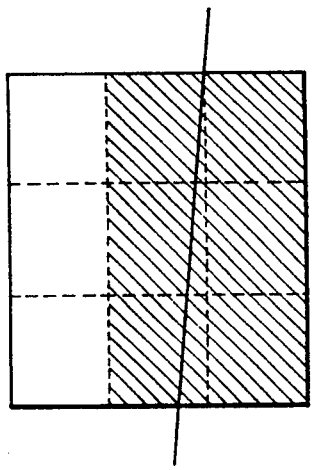
FIGS. 6A and 6B and 7A to 7D indicate problems particular to conventional antialiasing.
Figure 6B:
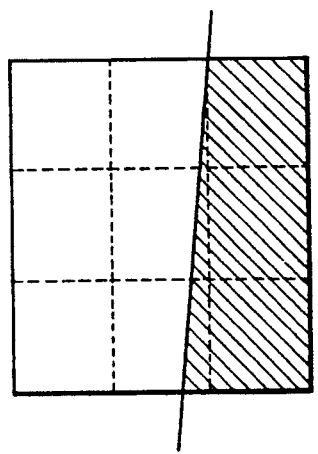

The antialiasing method using the N×N subpixel matrix has a problem left unsolved when applied to a conventional graphic data processing apparatus, as follows. Namely, excessively great N would increase the calculating time while excessively small N would limit the antialiasing effect. Customarily, therefore, moderate N is selected by considering the processing time as well as the subjective evaluation of image quality. A conventional graphic data processing apparatus implemented by the uniform averaging method uses only one kind of subpixel configuration (e.g. N*M submatrix) in calculating a tone (luminance and density). This is undesirable in that depending on the inclination of vector data, the tone derived from the actual area and the tone derived from the subpixel configuration greatly differ from each other, resulting in insufficient antialiasing. Specifically, when the inclination of vector data is nearly vertical or nearly horizontal, the N*M submatrix is apt to produce a tone different from the actual area ratio. Assume a 3*3 submatrix and an edge pixel which vector data traverses with a nearly vertical inclination, as shown in FIGS. 6A and 6B. Then, the probability that, among tones "0" to "9", tons "1" and "2" are produced is small while the probability that tons "3", "6" and "9" are produced is great. As a result, the tone derived from the actual area ("4", FIG. 6B) noticeably differs from the tone ("6", FIG. 6A) derived from the subpixel configuration, whereby the expected antialiasing effect is not achievable.

A graphic data processing apparatus using the weighted averaging scheme or the convolutional integration scheme reduces the difference between the tone derived from the actual area and the tone derived from the submatrix and thereby enhances the antialiasing effect, compared to the apparatus implemented by the uniform averaging method. However, such an apparatus increases the area ratio calculating time and thereby lowers the processing rate.

Figure 7B:
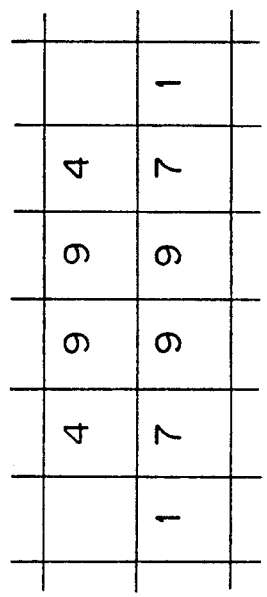
Figure 7D:
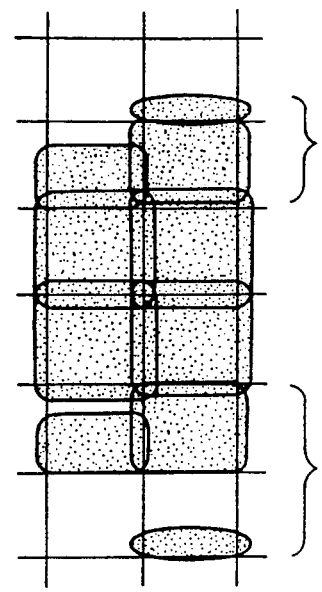
Figure 7A:
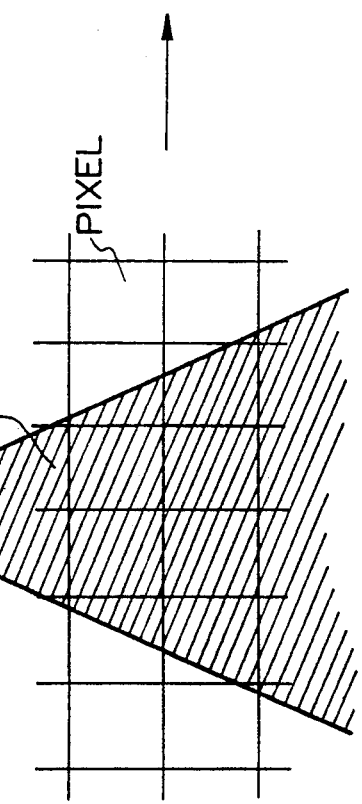
Figure 7C:
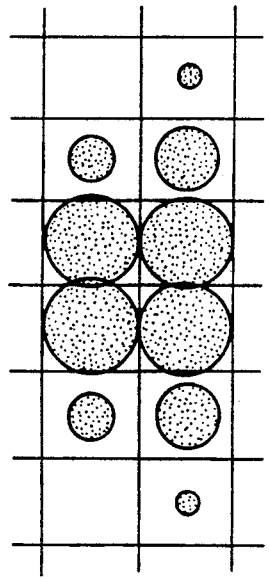

Moreover, in a graphic data processing apparatus implemented by any one of the conventional antialiasing schemes, despite that CRT is replaced with a lasr printer which outputs an image by an electrophotographic process, the luminance of CRT is simply replaced with the tone of the laser printer. In this condition, the antialiasing effect is not always attainable due to the characteristic of the electrophotoraphic process. Assume that a vector image shown in FIG. 7A is subjected to antialias processing to produce tones shown in FIG. 7B (tones "0" to "9" in the figure). When the resulted tones are displayed on CRT as luminances, an image as smooth as a vector image appears on the CRT due to the antialiasing effect, as shown in FIG. 7C. However, when the tones shown in FIG. 7B are used as densities and the output of a laser beam is adjusted by pulse width modulation to form a latent image, the density decreases at the left end (left edge) of the latent image and increases at the right end (right) edge of the same, as shown in FIG. 7D. This degrades the advantage particular to antialiasing and is ascribable to the fact that in the case of pulse width modulation a dot is formed by a laser beam whose duration (pulse width) depends on a tone and whose reference point is the left end of a pixel. As a result, the lower the tone of a dot, the farther the position of dot as measured from the position of an actual image. This not only prevents an image having tones resulted from antialiasing (see FIG. 7B) from being reproduced faithfully but also makes jaggs conspicuous.

Preferred embodiments of the graphic data processing apparatus in accordance with the present invention will be described hereinafter.

Embodiment 1

An image forming system incorporating a first embodiment of the present invention which is implemented as a PDL (Desk Top Publishing) controller will be described. The system forms an image by transforming vector data described in PDL (Page Description Language) and outputted by PDL into image data by the PDL controller.

Figure 8:
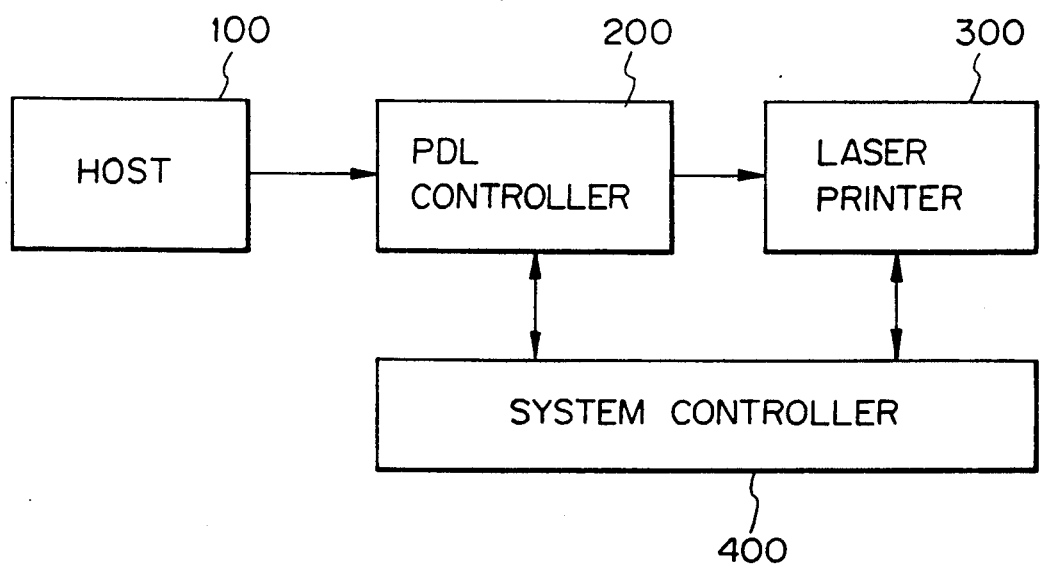
FIG. 8 is a block diagram schematically showing a first embodiment of the image forming system in accordance with the present invention.

As shown in FIG. 8, the image forming system has a host computer 100 for generating a document described in PDL (postscript language in the embodiment). A PDL controller (graphic data processing apparatus of the invention) 200 receives PDL from the host computer 100 page by page and develops it into black (BK), yellow (Y), magenta (M) and cyan (C) multi-level image data while executing antialias processing. A multi-level color laser printer 300 prins out the multi-level image data outputted by the PDL controller 200. A system controller 400 controls the operation of the laser printer 300.

Figure 9:
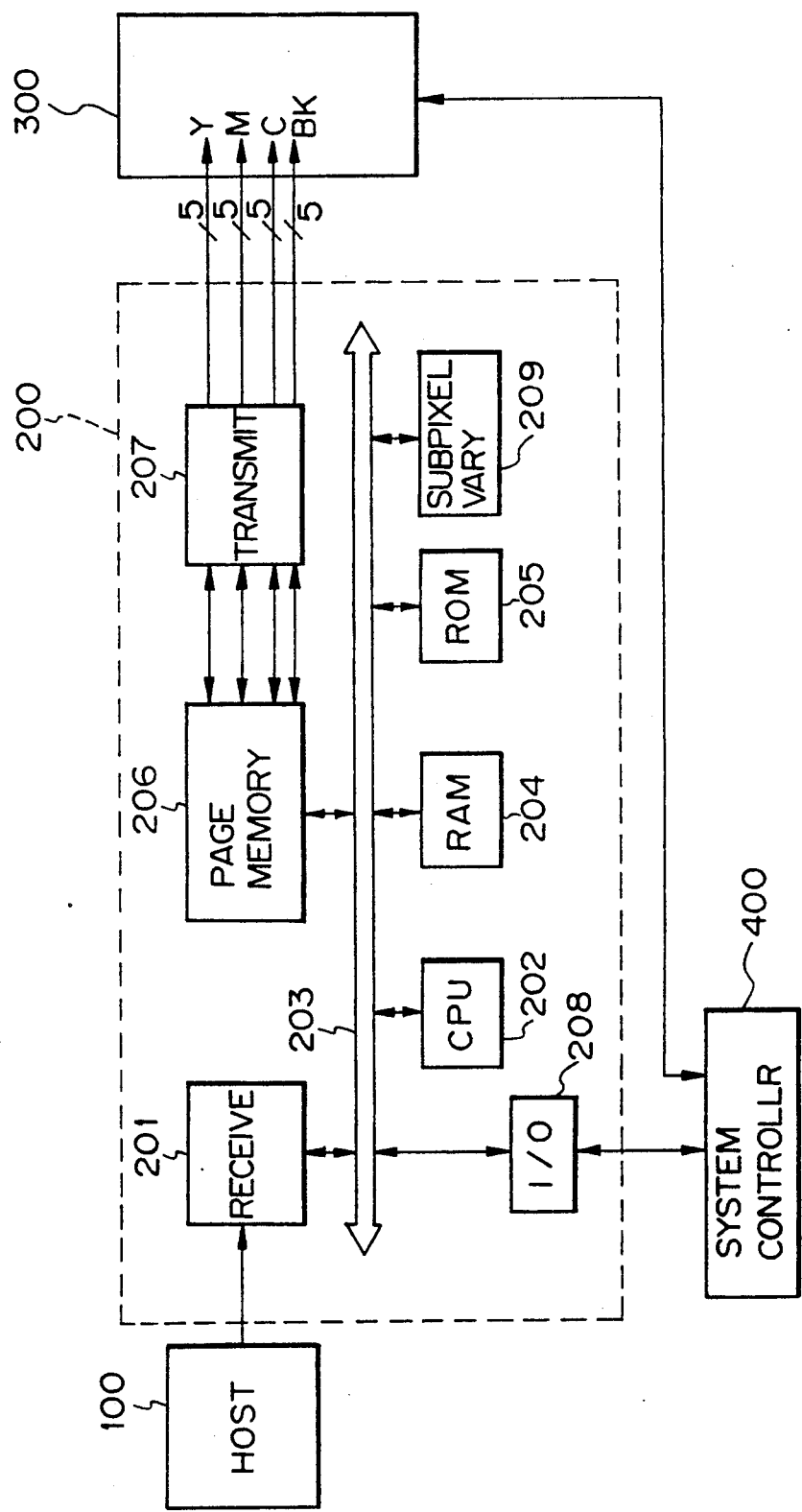
FIG. 9 is a block diagram schematically showing a specific construction of a PDL controller included in the embodiment.

FIG. 9 shows a specific construction of the PDL controller 200. As shown, the PDL controller 200 has a receiving unit 201 for receiving PDL fed from the host computer 100. A CPU 202 controls the storage of the received PD1 and executes various kinds of processing such as antialias processing. The reference numeral 203 designates an internal bus. A RAM 204 stores PDL transferred thereto from the receiving unit 201 over the bus 203. A ROM 205 stores an antialiasing program and other programs thereon. A page memory 206 stores multi-level Y, M, C and BK image data undergone antialias processing. A transmitting unit 207 transfers the Y, M, C and BK image data from the page memory 206 to the laser printer 300. An I/O (Input/Output) interface 208 interfaces the PDL controller 200 to the system controller 400. Subpixel varying means 208 is also connected to the bus 203. The CPU 202 stores PDL received by the receiving unit 201 in the RAM 204 via the system bus 203 according to the program stored in the ROM 205. On storing one page of PDL in the RAM 204, the CPU 202 executes an antialiasing procedure with the graphic element having been stored in the RAM 204 and thereby stores multi-level Y, M, C and BM image data in plain memory sections included in the page memory 206. The page memory 206 has a feature data memory section in addition to Y, M, C and BK plain memory sections. Afterwards, the data in the page memory 206 is fed to the laser printer 300 via the transmitting unit 207.

Figure 10A:
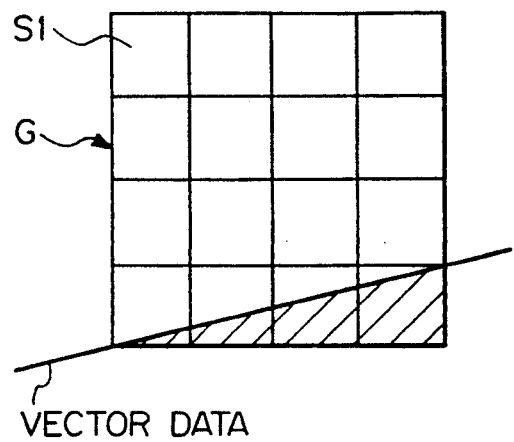
FIGS. 10A and 10B, 11 and 12A to 12C show the principle of the embodiment.
Figure 10B:
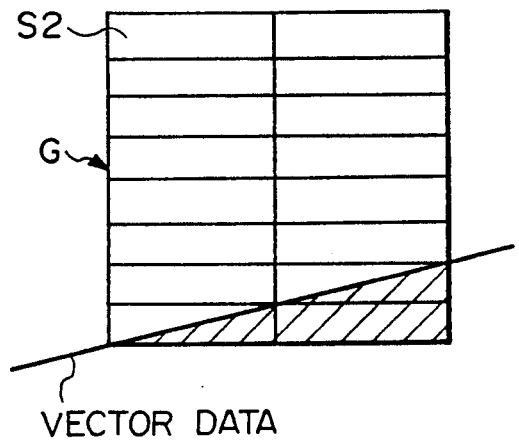
Figure 11:
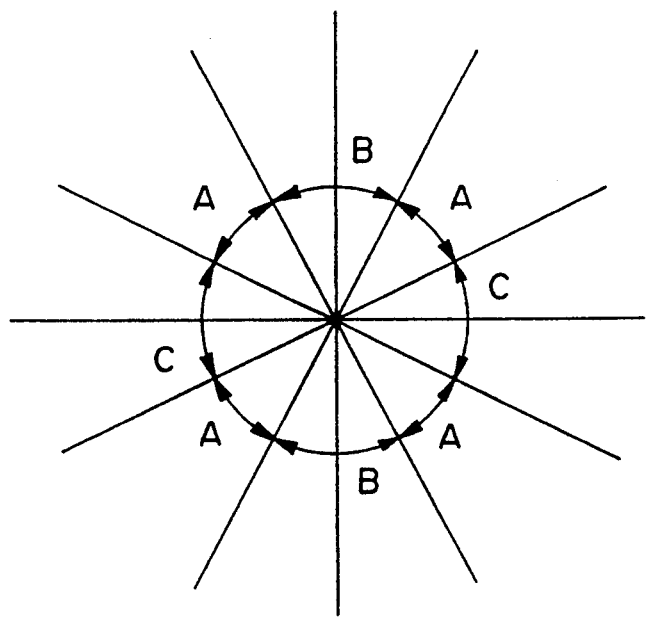
Figure 12A:
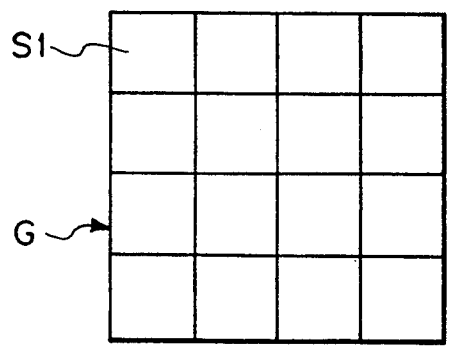
Figure 12B:
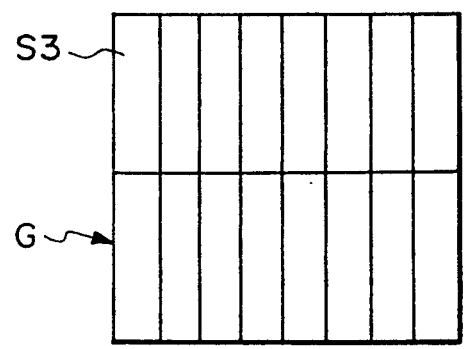
Figure 12C:
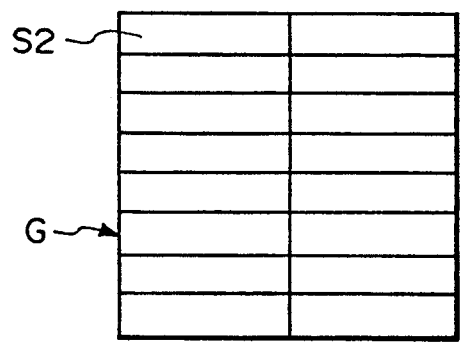

FIGS. 10A and 10B each shows part of, i.e., one pixel G of imgae data stored in the page memory 206. Specifically, FIG. 10A presents a case wherein the pixel G is divided into 4*4 subpixels S1 and four of the sixteen subpixels S1 are painted. FIG. 10B presents a case wherein the the pixel G is divided into eight subpixels in the vertical direction and two pixels in the horizontal direction and three of the sixteen subpixels S2 are painted. The pixel shown in FIG. 10A has a luminance of 25% while the pixel shown in FIG. 10B has a luminance of 18.75%. Since the real area of the hatched portion is 12.5%, dividing the pixel into different numbers of segments in the vertical and horizontal directions is sometimes higher in accuracy despite the same number of subpixels. In the light of this, as shown in FIG. 11, zones A, B and C are defined in matching relation to the inclination of the line to the x and y axes. As shown in FIG. 12A to 12C, 4 * 4 subpixels S1, 2 * 8 subpixels S3, and 8 * 2 subpixels S2 are assigned to the zones A, B and C, respectively. This is successful in enhancing accurate antialias processing.

Figure 14:
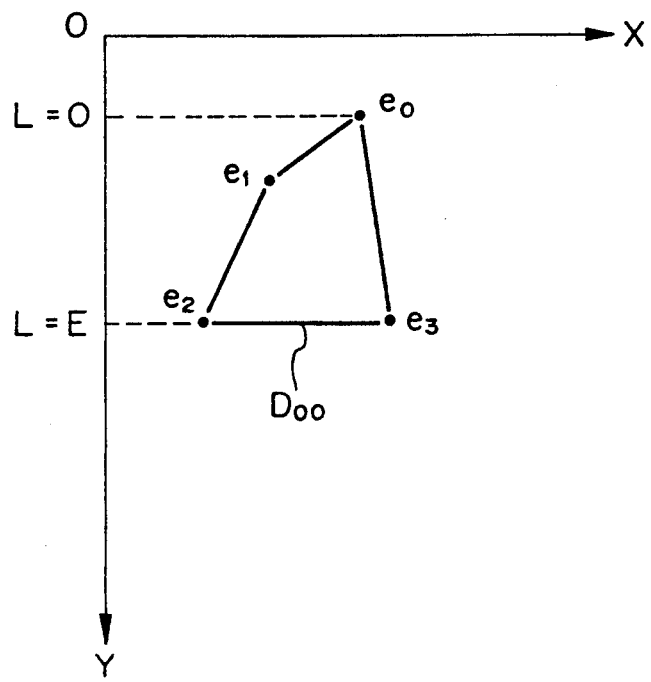
FIGS. 14 and 15 each shows the operation of the embodiment.
Figure 15:
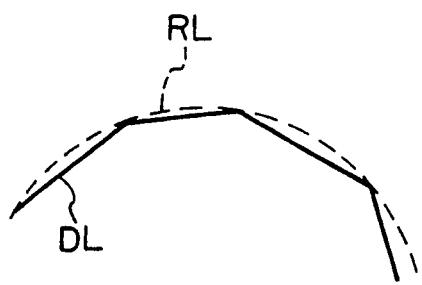

A specific operation of the PDL controller 200 will be described with reference to FIG. 13. First, the coordinates representative of the start and end points of lines such as those shown in FIGS. 10A, 10B and 11 and the inclinations obtainable from the coordinates are stored in the RAM 204 as table data beforehand. Assume that graphic data $D_{00}$ shown in FIG. 14 has been stored in the page memory 206. Then, the position of the start line L which is O and the position of the end line L which is E are respectively coincident with the Y axis of points $e_0 (X_0, Y_0)$ and $e_2 (X_2, Y_2)$ of the graphic data $D_{00}$. Hence, the Y coordinate of the start $L=0$ of the graphic data $D_{00}$ is read (step S601), and then curved edges are subjected to linear approximation (S602). It is to be noted that term "linear approximation" refers to processing which, as shown in FIG. 15, represents a curve RL by a set of lines DL. The coordinates of the start and end points of the so approximated line and the inclination produced from the two coordinates are stored as table data (S603). When the subpixel varying means 209 processes each line L, the inclination of the approximated line is determined on the basis of the table data and the table data which is stored in the RAM 204 beforehand. Next, the zone to which the obtained inclination belongs is determined (S604), and then the sizes of the subpixels S1, S2 and S3 are determined (S605). Subsequently, scan line conversion is executed in each of the subpixels S1, S2 and S3 in matching relation to the inclination of the approximated line (S606). Then, a luminance is calculated on the basis of the number of painted pixels S1, S2 and S3 (S607) and written as pixel luminance data (S608). Such a procedure is repeated from $L=0$ to $L=E$ (S609 and S610).

As stated above, the embodiment changes the size in which a pixel is divided into subpixels, on the basis of the inclination of an approximated line. This allows the subpixel size for the calculation of a pixel luminance to be changed in matching relation to the inclination of an approximated line. As a result, more effective and accurate antialiasing is achievable with the variable subpixel size than with a fixed subpixel size, enhancing the quality of a resultant image.

Embodiment 2

An image forming system having a PDL controller which is implemented by the graphic processing apparatus will be described hereinafter.

(1) Outline of Antialiasing

Figure 16A:
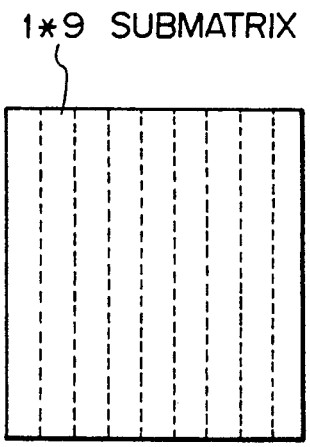
FIGS. 16A to 16F show antialiasing particular to a second embodiment of the present invention.
Figure 16B:
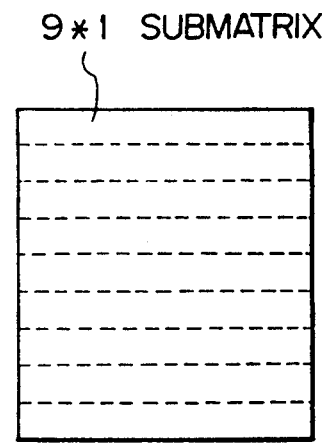
Figure 16C:
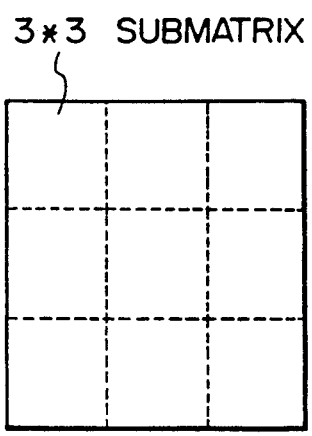
Figure 16D:
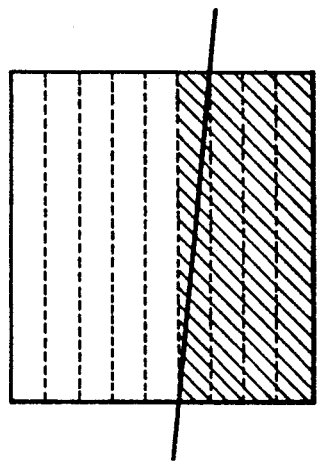
Figure 16E:
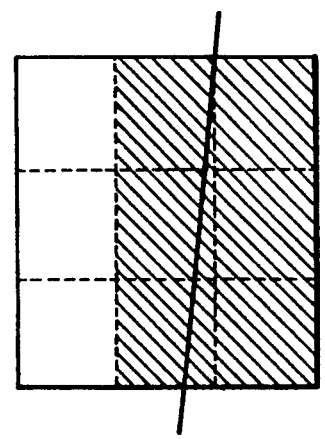
Figure 16F:
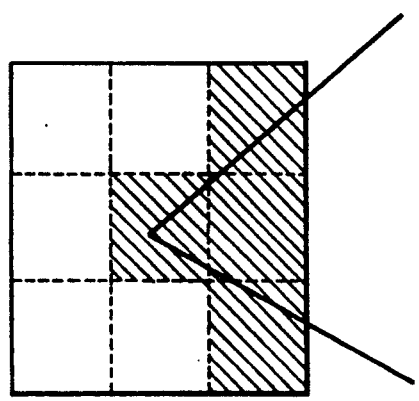

Referring to FIGS. 16A to 16C, three different subpixel configurations (referred to as "submatrixes" hereinafter) applicable to this embodiment are shown. Specifically, FIGS. 16A to 16C show respectively a 1 * 9 submatrix applicable to a vector data inclination $\theta$ which is tan $\theta > 9/2$ (i.e. $77.47° < \theta < 102.53°$), a 9 * 1 submatrix applicable to a vector data inclination $\theta$ which is $2/9 > \tan \theta > -2/9$ (e.g. $12.53° > \theta > -12.53°$), and a 3 * 3 submatrix applicable to the other vector data inclinations $\theta$. When a marginal point (start or end of vector data) exists in an edge pixel, the embodiment uses the submatrix of FIG. 16C since the inclination $\theta$ of the vector data cannot be determined unconditionally. For example, when the inclination $\theta$ of the vector data is tan θ>9/2 and, therefore, nearly vertical, tone "4" is produced by use of the 1 * 9 submatrix and the division shown in FIG. 16D. On the other hand, when the conventional method (3 * 3 submatrix) is used to determined a tone of the same edge pixel, tone "6" is obtained, as shown in FIG. 16E. As a result, the tone resuled from the 1 * 9 submatrix is closer (or equal) to the actual tone than the 3 * 3 submatrix. When a maginal point exists in an edge pixel, a tone is determined by the 3 * 3 submatrix, as shown in FIG. 16F.

The processing described above executes decision on the basis of the inclination θ readily obtainable from the vector data of an edge pixel and whether or not a marginal point exists. Regarding which subpixels the vector data traverses, the above processing uses the same decision principle as the conventional processing. Hence, the processing rate is substantially the same as the rate particular to the conventional uniform averaging scheme. Stated another way, the processing speed is far higher than the processing speed achievable with the weighted averaging scheme and convolutional integration scheme.

(2) Block Diagram of Image Forming System

Figure 17:
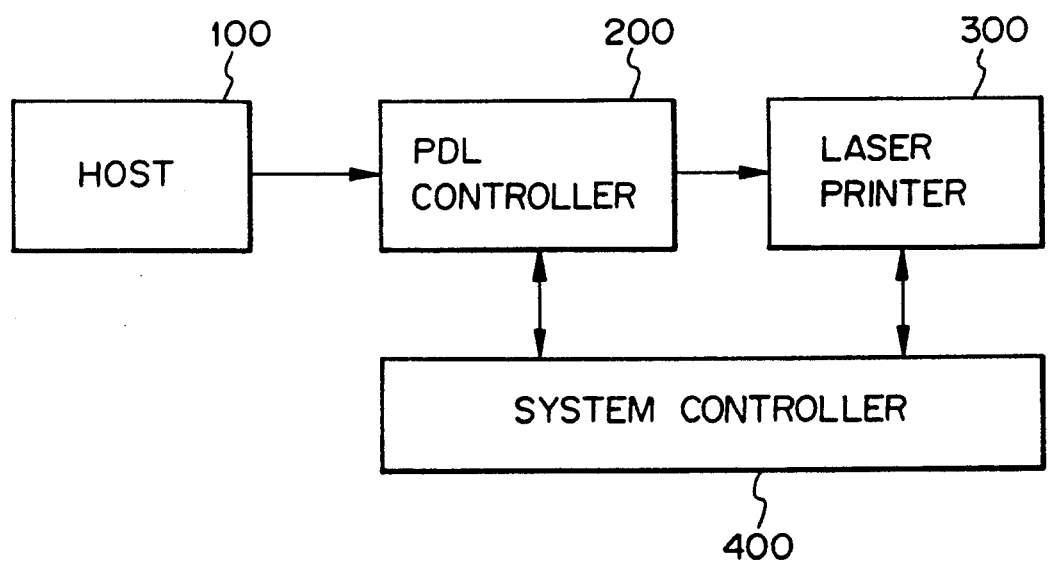
FIG. 17 is a block diagram schematically showing the second embodiment.

The illustrative embodiment transforms vector data described in PDL and outputted by DTP into image data via the PDL controller. The system construction of the embodiment will be described with reference to FIG. 17.

The image forming system has a host computer 100 for generating a document described in PDL (postscript language in the embodiment). A PDL controller (graphic data processing apparatus of the invention) 200 receives PDL from the host computer 100 page by page and develops it into black BK, Y, M, and cyan C multi-level image data while executing antialias processing. A multi-level color laser printer 300 prins out the multi-level image data outputted by the PDL controller 200. A system controller 400 controls the operation of the laser printer 300.

(3) Construction and Operation of PDL Controller

Figure 18:
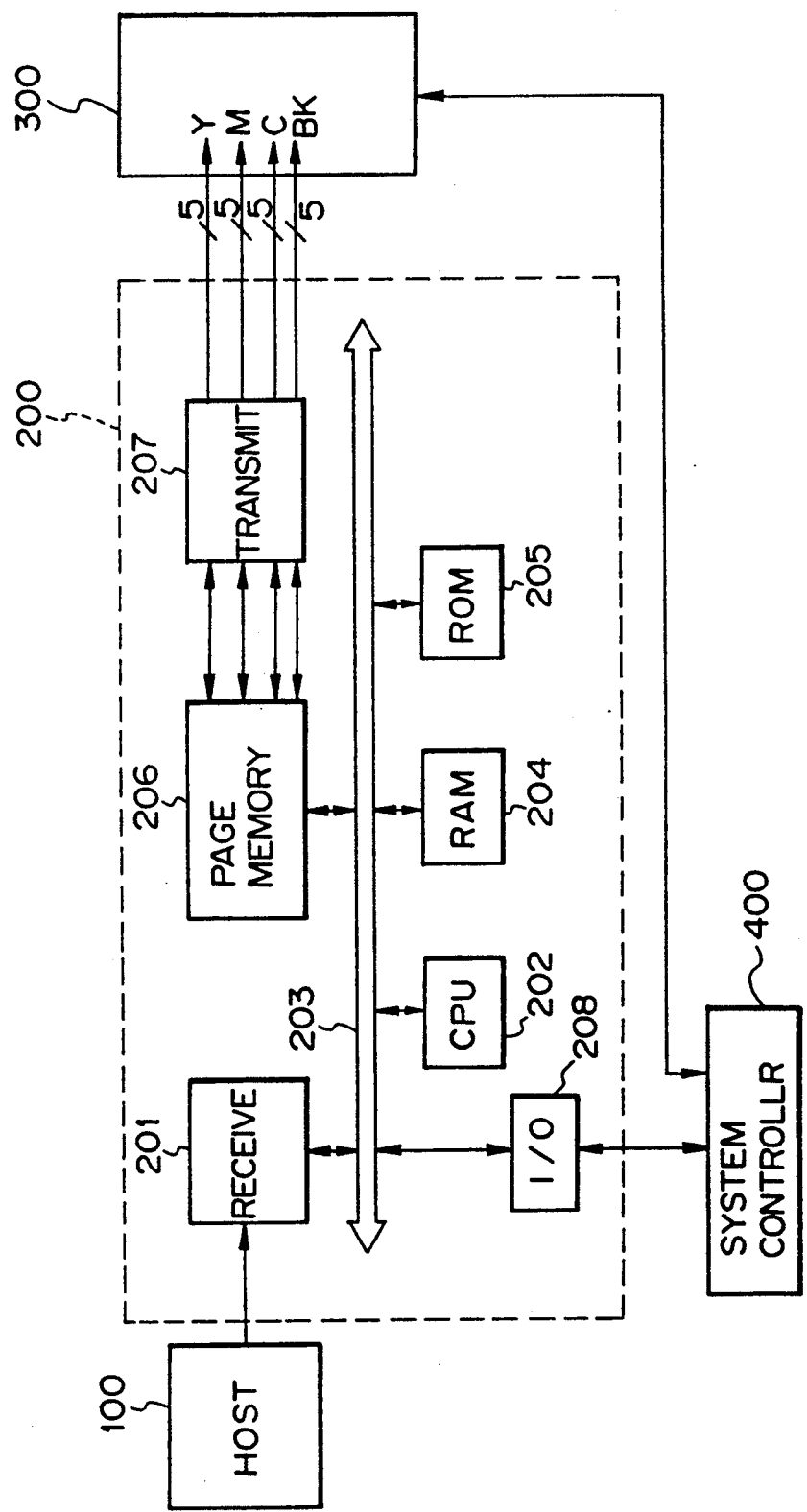
FIG. 18 is a block diagram schematically showing a specific construction of a PDL controller included in the second embodiment.

FIG. 18 shows a specific construction of the PDL controller 200. As shown, the PDL controller 200 has a receiving unit 201 for receiving PDL fed from the host computer 100. A CPU 202 controls the storage of the received PD1 and executes various kinds of processing such as antialiasing. The reference numeral 203 designates an internal bus. A RAM 204 stores PDL transferred thereto from the receiving unit 201 over the bus 203. A ROM 205 stores an antialiasing program and other programs thereon. A page memory 206 stores multi-level Y, M, C and BK image data undegone antialias processing. A transmitting unit 207 transfers the Y, M, C and BK image data from the page memory 206 to the laser printer 300. An I/O (Input/Output) interface 208 interfaces the PDL controller 200 to the system controller 400. The CPU 202 stores PDL received by the receiving unit 201 in the RAM 204 via the system bus 203 according to the program stored in the ROM 205. On storing one page of PDL in the RAM 204, the PUC 202 executes an antialiasing procedure with the graphic element having been stored in the RAM 204 and thereby stores multi-level Y, M, C and BK image data in plain memory sections included in the page memory 206. The page memory 206 has a feature data memory section in addition to Y, M, C and BK plain memory sections. Afterwards, the data in the page memory 206 is fed to the laser printer 300 via the transmitting unit 207.

Figure 19A:
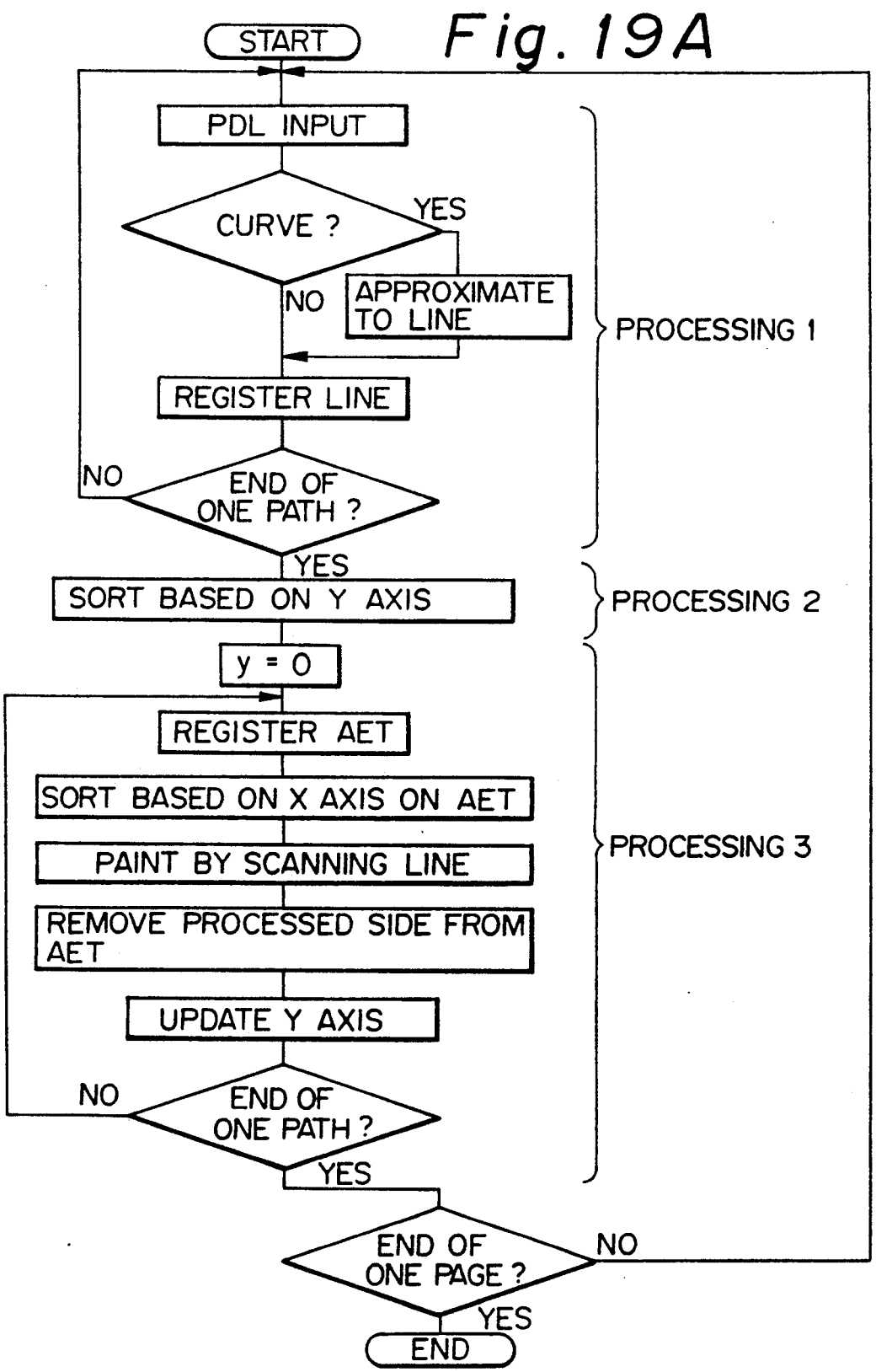
FIG. 19A is a flowchart representative of a specific operation of the PDL controller.

Referring to FIG. 19A, a specific operation of the CPU 202 included in the PDL controller 200 will be described. Receiving PDL page by page from the host computer 100, the PDL controller 200 develops it into BK, Y, M and C color image data while subjecting it to antialias processing. Regarding PDL, both the graphics and texts are described in vector data, and image data are dealt with on a page basis. One page is made up of more than one paths each having one or a plurality of elements (graphic and text elements).

Figure 19B:
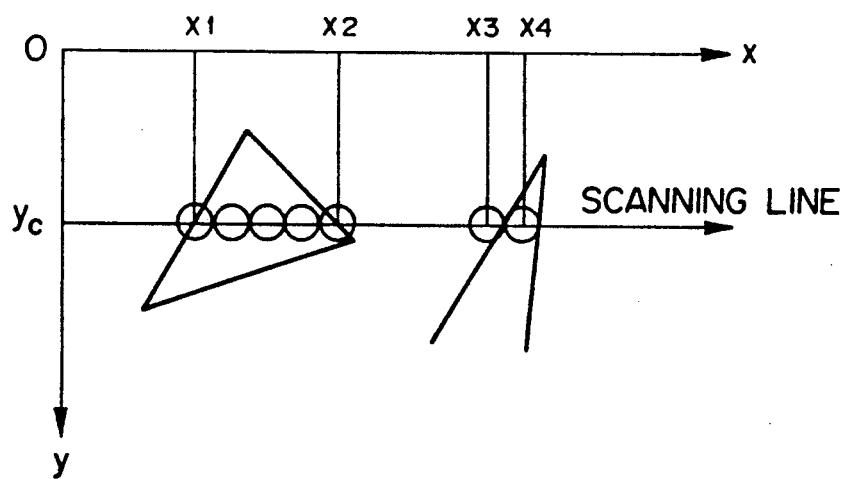
FIG. 19B shows a procedure for painting a path.

On receiving PDL, the CPU 202 determines whether or not the element is a curve vector and, if it is a curve vector, approximates it to a line vector and then registers it in a working area as a line. The CPU 202 repeats this operation with all of the graphic and text elements included in one path to register resulted lines in the working area on a path basis (processing 1). Subsequently, the CPU 202 sorts the lines registered in the working area with respect to the start y axis of the line (processing 2). Then, the CPU 202 paints the path by scanning lines while updating the y axis (processing 3). In this embodiment, the term "scanning line" refers to a line whose thickness is less than one pixel, as distinguished from a one-pixel scanning line having a thickness corresponding to one pixel. For example, when a path shown in FIG. 19B is to be painted, the CPU 202 registers the elements located at the sides which a scanning line yc traverses and the real numerical values of the x coordinates traversing the scanning line yc ($x_1$, $x_2$, $x_3$ and $x_4$, FIG. 19B) in AET (Active Edge Table). Since the elements are registered in the working area in the order in which they have been registered by the processing 1, the x coordinates crossing the scanning line yc are not always registered in the increasing order. For example, assuming that the line which the scanning line yc and the coordinate $x_3$ traverse has been processed by the processing 1 first, then $x_3$ is registered in AET first as an x coordinate. Therefore, after the registration in AET, the elements of the individual sides registered in AET are sorted in x coordinate in the increasing order. Two elements as counted from the smallest x coordinate are paired, and then the space between the two elements is painted (specifically, painting by a one-pixel scanning line defined by nearby scanning lines yc and yc+1). In the event of such painting, antialiasing is implemented by adjusting the density of each edge pixel in conformity to the area ratio. The processed side is removed from AET, and then the scanning line or y axis is updated. The CPU 202 repeats this sequence of steps until it process all of the sides registered in AET, i.e., all of the elements constituting one path.

The CPU 202 executes the consecutive processing 1, 2 and 3 on a path basis and repeats them until it reaches the last path of one page.

Figure 19C:
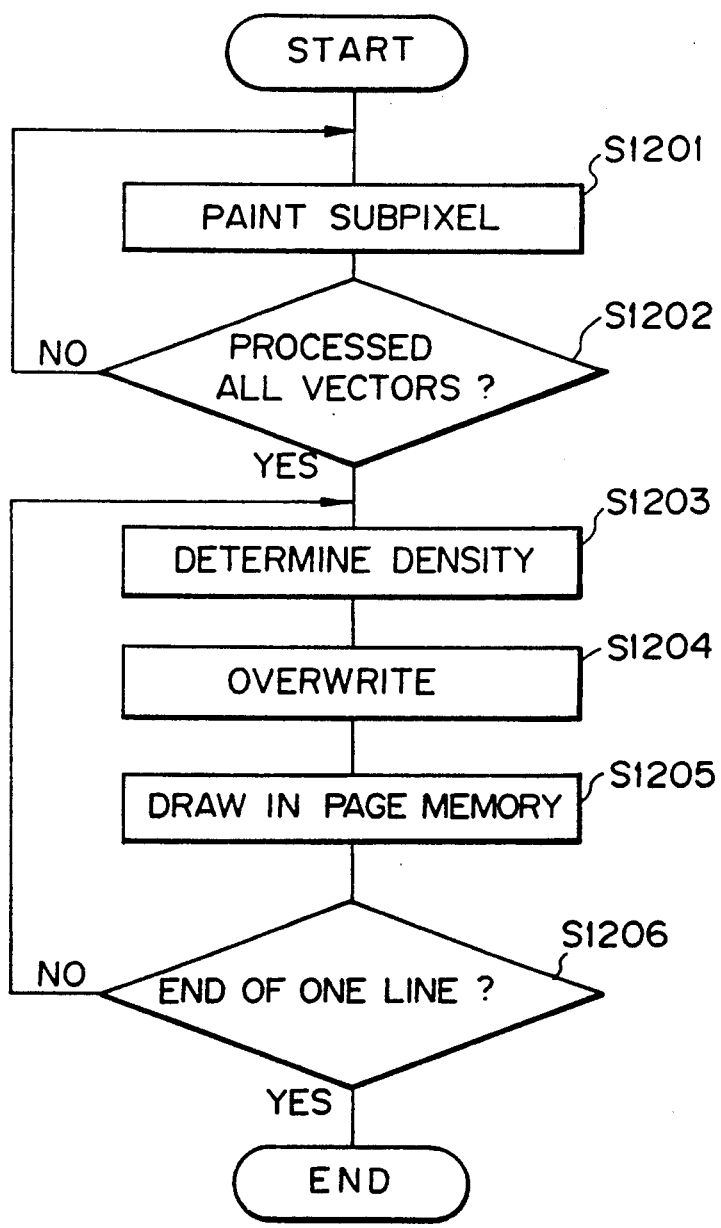
FIG. 19C is a flowchart representative of antialiasing processing.
Figure 20A:
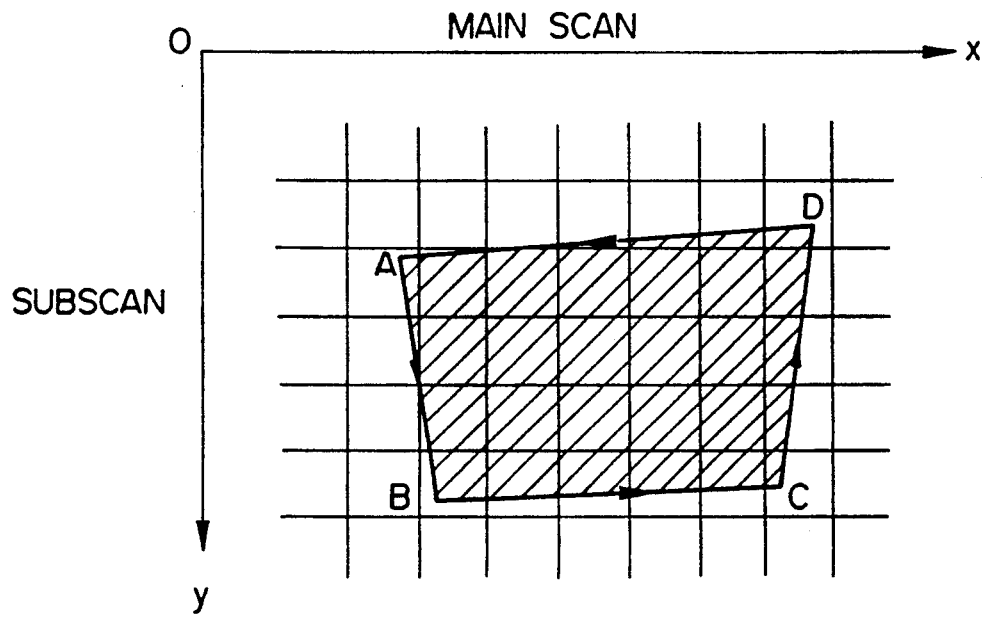
FIGS. 20A and 20B indicate the division of a figure into line vectors.

FIG. 19C shows a specific sequence of steps representative of antialias processing which is executed during the painting procedure, i.e. processing 3. Assume that a square ABCD shown in FIG. 20A is inputted during the processing 1, FIG. 19A. The square ABCD has the following elements:

(a) four line vectors AB, BC, CD and DA (real number notation)

(b) colors and luminances in the square

Figure 20B:
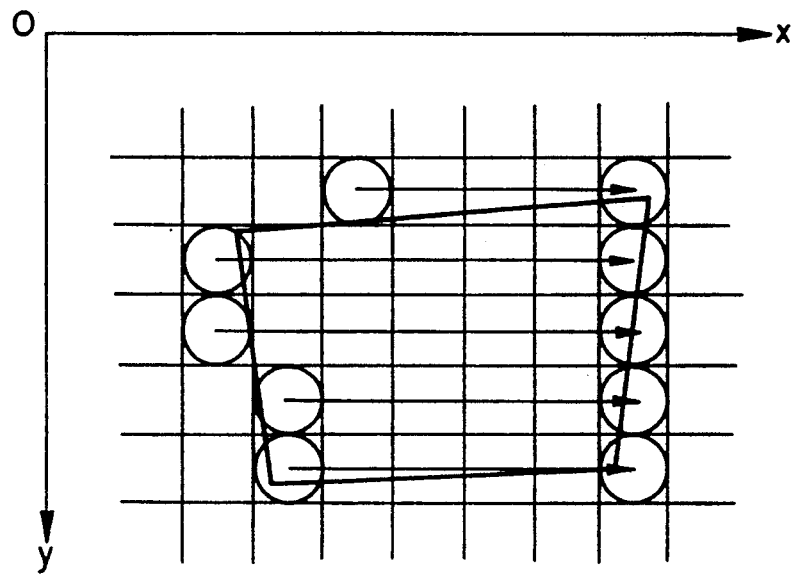

As shown in FIG. 20B, the square ABCD is divided into five line vectors extending in the main scanning direction (real number notation). In the embodiment, data is added to the start and end points of each of the five line vectors, as follows:

(c) coordinates of the start point of the vector elements (above-mentioned (a)) which define the start and end points of the line vector (real number notation)

(d) inclination of the vector elements which define the start and end points of the line vector (e) features of the start and end points of the line vector (right and left edges, apexes, lines thinner than one dot, crossing points of lines, etc).

When an edge pixel is detected during the painting procedure, the antialias processing shown in FIG. 19C is executed.

Specifically, at the beginning of the subpixel painting process, whether or not a marginal point of vector data exists in an edge pixel is determined. If the answer of the decision is positive, the pixel is subdivided into subpixels by use of the 3 * 3 submatrix shown in FIG. 16C so as to determine subpixels which should be painted. If the answer of the decision is negative, the inclination $\theta$ of the vector data is determined. Then, the pixel is divided into subpixels by use of the 1 * 9 submatrix if $\tan \theta > 9/2$ (see FIG. 16A), by use of the 9 * 1 submatrix if $2/9 > \tan \theta > -2/9$ (see FIG. 16B), or by use of the 3 * 3 submatrix if otherwise (see FIG. 16B). This is also followed by the step of determining subpixels which should be painted (S1201). Such a procedure is repeated with all of the vectors which cross the scanning line (S1202). Subsequently, the tones (densities) of the individual pixels are calculated, the first pixel on the scanning line being first (S1203). This is followed by overwriting processing for calculating the tones (densities) of the individual colors (BK, R, G and B) of the figure (S1204), although not described specifically. Afterwards, the tones of the individual colors are written to the page memory by a conventional procedure (S1205). The steps S1203 to S1205 are repeated with all of the pixels defining one line (S1206).

The CPU 202 executes the above-stated iterative sequence of steps to the last pixel of the scanning lines (y axis) while updating the previously mentioned content (c) by the data of (d). FIG. 21 shows the tones k of the square ABCD, FIG. 20A, having been produced by the antialias processing. The tones k are developed into BK, Y, M and C images by predetermined Y, M, C and BK transform processing on the basis of the colors and luminances in the figure (data (b)), and then written as image data to the associated plain memory sections of the page memory 206. Regarding the Y, M, C and BK transform processing, the embodiment has a Y, M, C and BK transform program as software, although not shown or described specifically. FIGS. 22A to 22D show BK, C, M and Y data resulted from a relation C:M:Y=1:0.5:0.3 and 100% UCR (Undercolor Removal).

(4) Construction and Operation of Laser Printer

Referring to FIG. 23, the multi-color laser printer 300 has a developing section 301 for uniformly charging the surface of a photoconductive drum which will be described, exposing the charged surface by a laser beam to form a latent image, developing the latent image by a toner, and then transferring the resulted toner image to a recording medium. Specifically, the developing section 301 has a BK developing and transferring section 301bk, a C developing and transferring section 301c, an M developing and transferring section 301m, and a Y developing and transferring section 301y assigned to BK data, C data, M data and Y data, respectively, as will be described in detail later. A laser driving section 302 receives 5-bit Y, M, C and BK data, i.e., image density data from the PDL controller 200 and, in response, outputs a laser beam. The laser driving section 302 has buffer memories 303y, 303m and 303c to which the 5-bit Y, M and C data are respectively applied, laser diodes 304y, 304m, 304c and 304bk for emitting laser beams associated respectively with the Y, M, C and BK data, and drivers 305y, 305m, 305c and 305bk for driving respectively the laser diodes 304y, 304m, 304c and 304bk. The BK developing and transferring section 301bk, laser driving section 202, laser diode 304bk and driver 305bk will be referred to as a BK recording unit BKU collectively hereinafter (see FIG. 24). Likewise, the combination of the C developing and transferring unit 301c, laser diode 304c, driver 305c and buffer memory 303c will be called a C recording unit CU (see FIG. 24). The combination of the M developing and transferring section 301m, laser diode 304m, driver 305m and buffer memory 303m will be called an M recording unit MU (see FIG. 4). Further, let the combination of the Y developing and transferring section 301y, laser diode 304y, driver 305y and buffer memory 303y be called a Y recording unit YU (see FIG. 24). As shown in FIG. 23, the recording units BKU, CU, MU and YU are sequentially arranged around a transport belt 306 for transporting a recording medium in this order with respect to an intended direction of transport. In this configuration, the laser diode 304bk effects exposure first, and the laser diode 304y effects it last. To hold image data (output of the PDL controller 200) during the intervals between such successive exposure, the buffer memories 303y, 303m and 303c are incorporated in the laser driving section 302.

Figure 24:
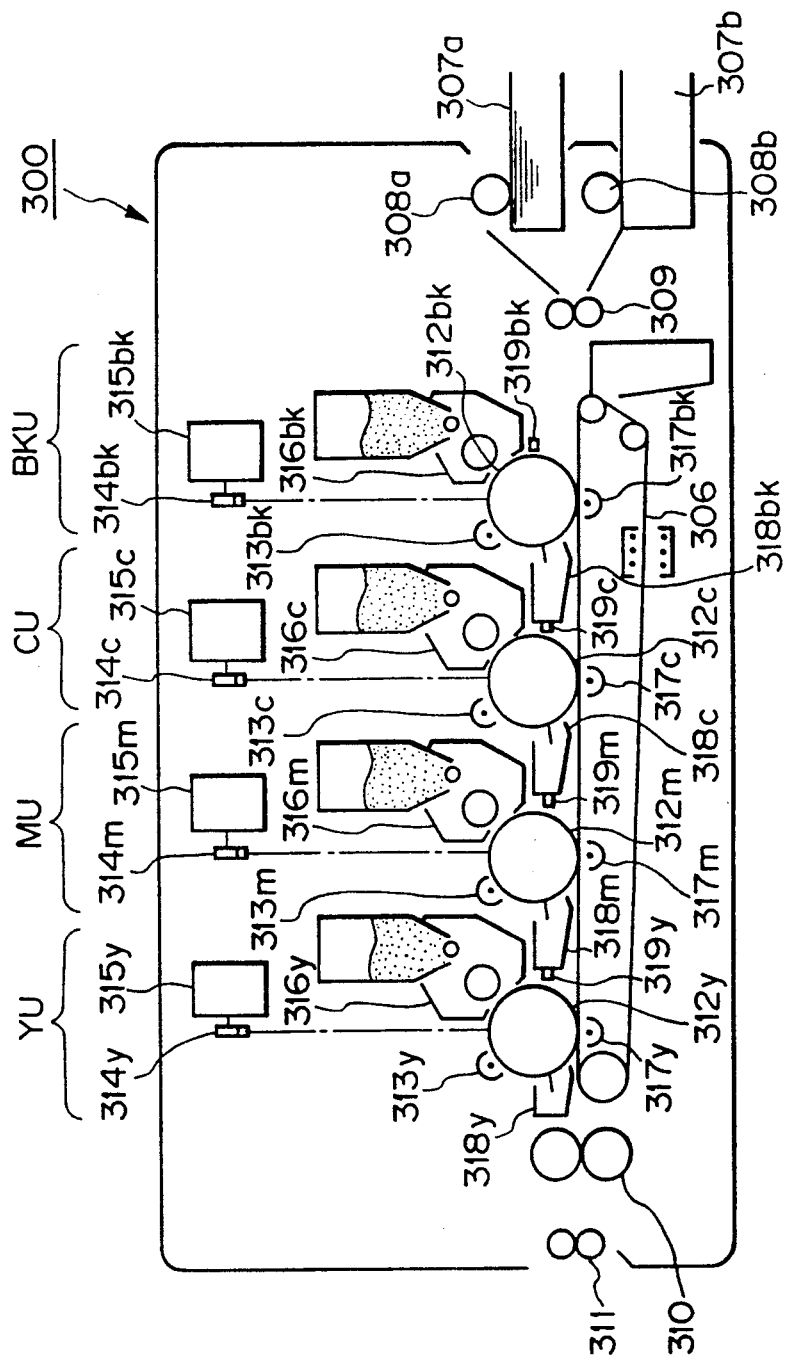
FIG. 24 is a section showing a specific construction of the laser printer.

Referring to FIG. 24, the multi-level color laser printer 300 has the transport belt 306, and the recording units YU, MU, CPU and BKU arranged around the belt 306, as stated above. Cassettes 307a and 307b each is loaded with a recording medium in the form of paper sheets. Feed rollers 308a and 308b are respectively associated with the cassettes 307a and 307b for feeding the paper sheets one at a time. A register roller 309 positions the paper sheet fed from any one of the cassettes 307a and 307b. A fixing roller 310 fixes images sequentially transferred to the paper sheet by the recording units BKU, CU, MU and YU. The paper sheet or print coming out of the fixing roller 310 is driven out to a predetermined section by a discharge roller 311. The recording units YU, MU, CU and BKU have respectively photoconductive drums 312y, 312m, 312c and 312bk, chargers 313y, 313m, 313c and 313bk for uniformly charging respectively the drums 312y, 312m, 312c and 312bk, polygonal mirrors 314y, 314m, 314c and 314bk and motors 315y, 315m, 315c and 315bk for steering respectively the laser beams to the drums 312y, 312m, 312c and 312bk, developing devices 316y, 316m, 316c and 316bk for developing respectively the latent images formed on the drums 312y, 312m, 312c and 312bk by toners of different colors, transfer chargers 317y, 317m, 371c and 317bk for transferring the developed images or toner images to a paper sheet, and cleaning devices 318y, 318m, 318c and 318bk for removing respectively the toner particles remaining on the drums 312y, 312m, 312c and 312bk after the image transfer. CCD line sensors 319y, 318m, 319c and 319bk sense respectively predetermined patterns provided on the drums 312y, 312m, 312c and 312bk to show the process conditions of the laser printer 300, although not shown or described specifically. The operation of the laser printer 300 will be described by taking the Y recording unit YU as an example.

Figure 25A:
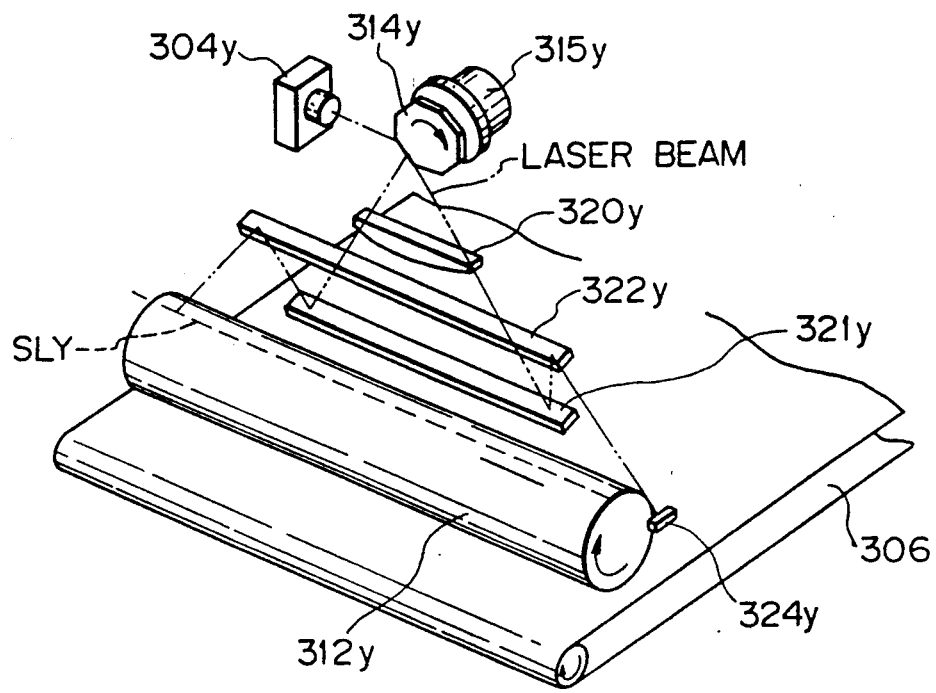
FIGS. 25A and 25B show a specific construction of a yellow recording unit.
Figure 25B:
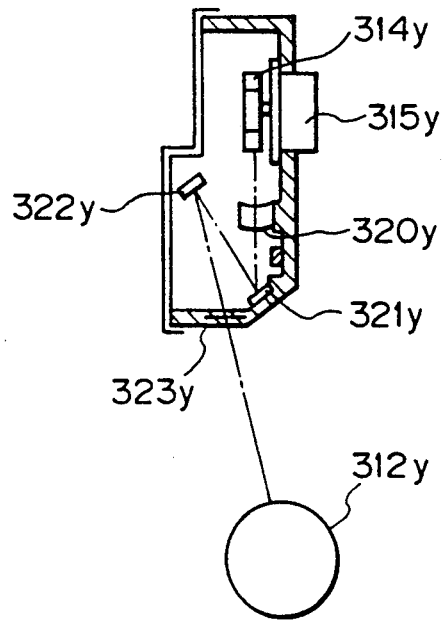

FIGS. 25A and 25B show a specific construction of the exposing arrangement of the Y recording unit YU. As shown, a laser beam issuing from the laser diode 304y is reflected by the polygonal mirror 314y, transmitted through an f-theta lens 320y, reflected by mirrors 321y and 322y, and then transmitted through a dustproof glass 323y to reach the drum 312y. Since the polygon mirror 314y is driven by the motor 315y at a constant speed, the laser beam is sequentially shifted along the axis of the drum 312y (main scanning direction). In the illustrative embodiment, a photosensor 324y is disposed in a non-exposing area to sense a reference point of main scanning. Since the laser diode 304y is driven on the basis of recording data (5-bit data outputted by the PDL controller 200), the drum 304y is subjected to multi-level exposure associated with the recording data. As a result, a latent image corresponding to a document image is electrostatically formed on the surface of the drum 304y which has been uniformly charged by the charger 313y. The Y developing unit 316y develops the latent image by a yellow toner. The resulted yellow toner image is transferred to a paper sheet which is fed from the cassette 307a (or 307b) by the feed roller 308a (or 308b) and then transported by the belt 306 in synchronism with the formation of a toner image by the BK recording unit BKU by way of the register roller 309.

The other recording units BKU, CPU and MU are constructed and operated in the same manner as the recording unit YU except that they have a BK developing device 316bk, a C developing device 316c, and an M developing device 316c, respectively.

(5) Multi-Level Drive by Driver

The drivers 305y, 305m, 305c and 305bk drive respectively the laser diodes 304y, 304m, 304c and 304bk in response to 5-bit Y, M, C and BK data which are fed thereto from the image processing device 400. For this purpose, use is made of pulse width modulation. The multi-level drive using pulse width modulation will be described with reference to FIGS. 26A to 26D. Since the drivers 305y, 305m, 305c and 305bk and the laser diodes 304y, 304m, 304c and 304bk each has an identical construction, the following description will concentrate on the driver 305y and laser diode 304y by way of example.

Figure 26A:
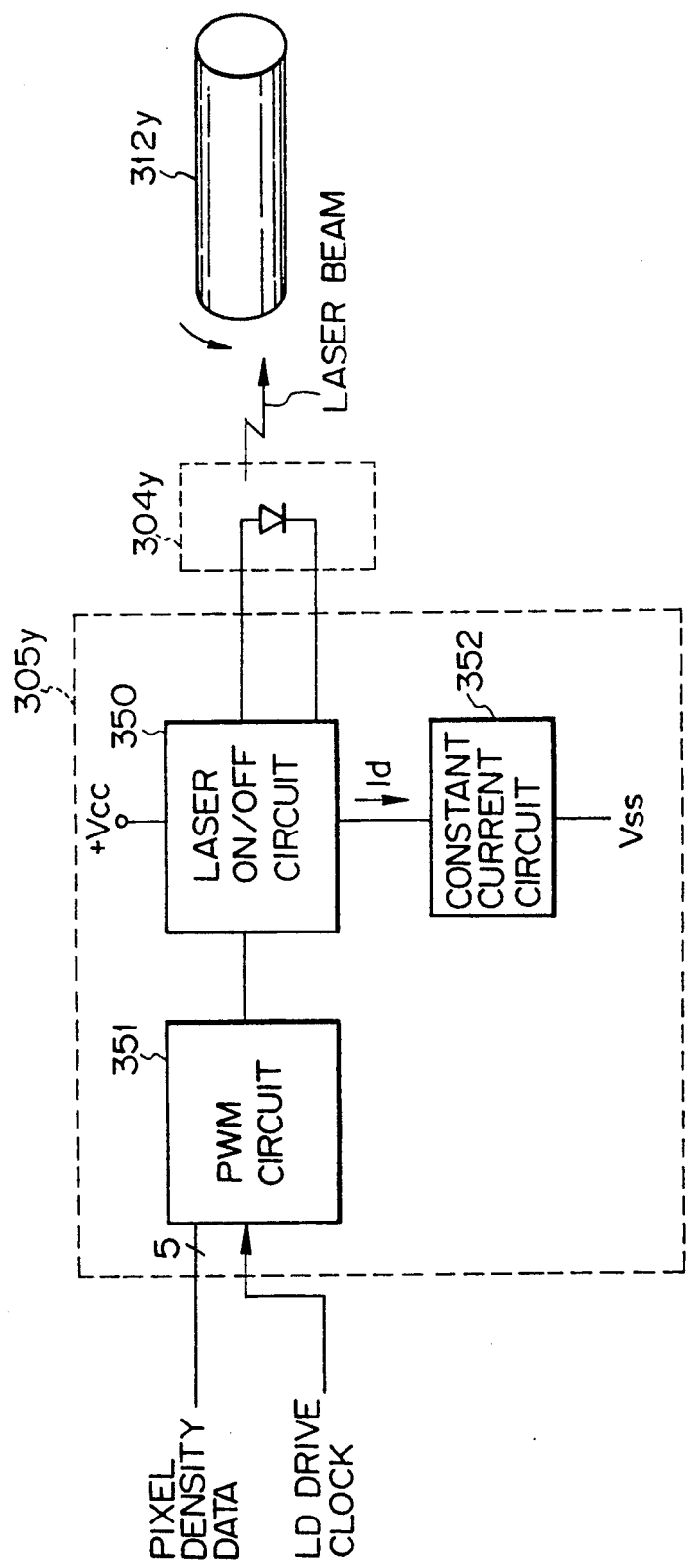
FIGS. 26A to 26D show multi-level drive using pulse width modulation.
Figure 26B:
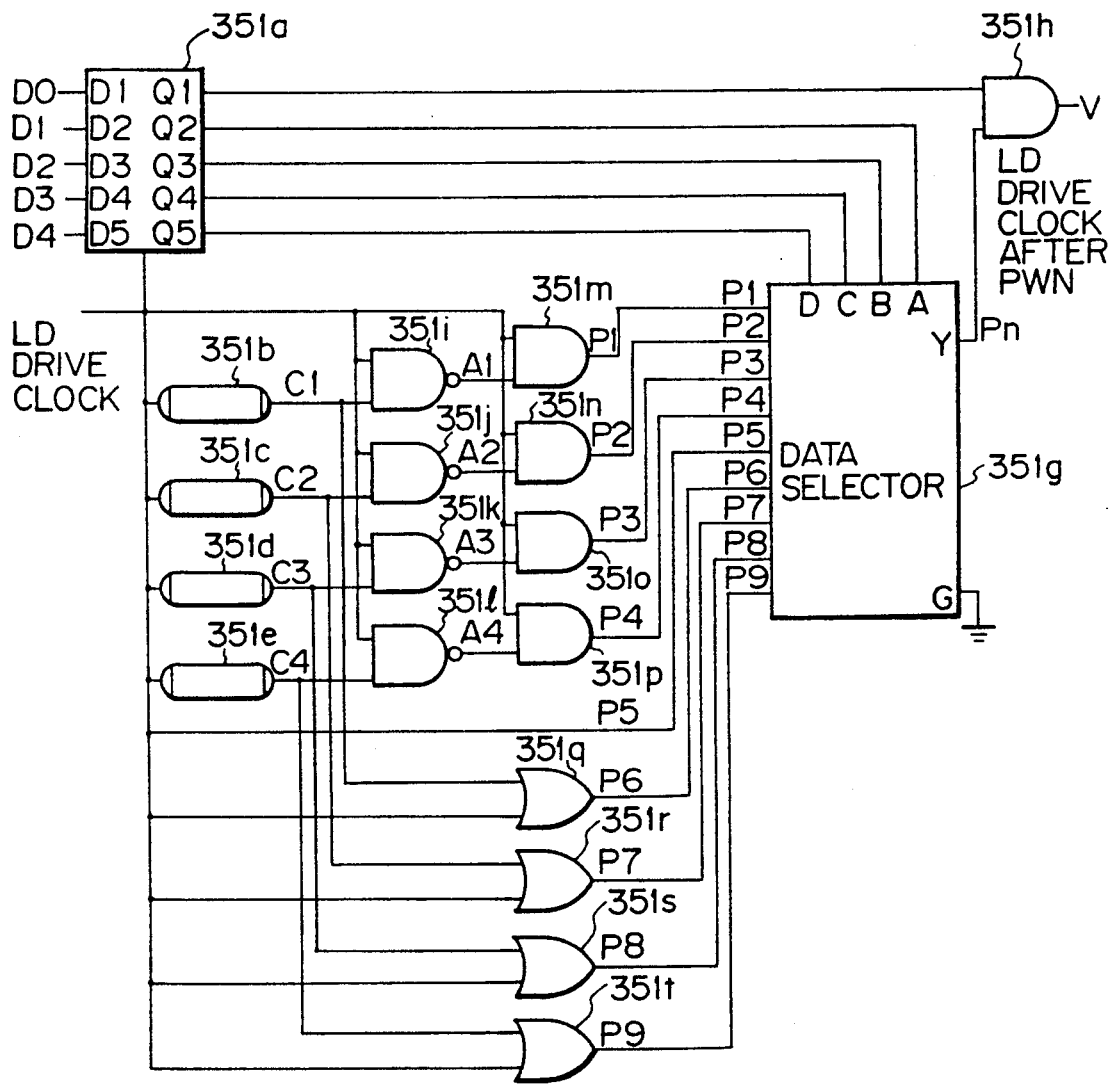
Figure 26C:
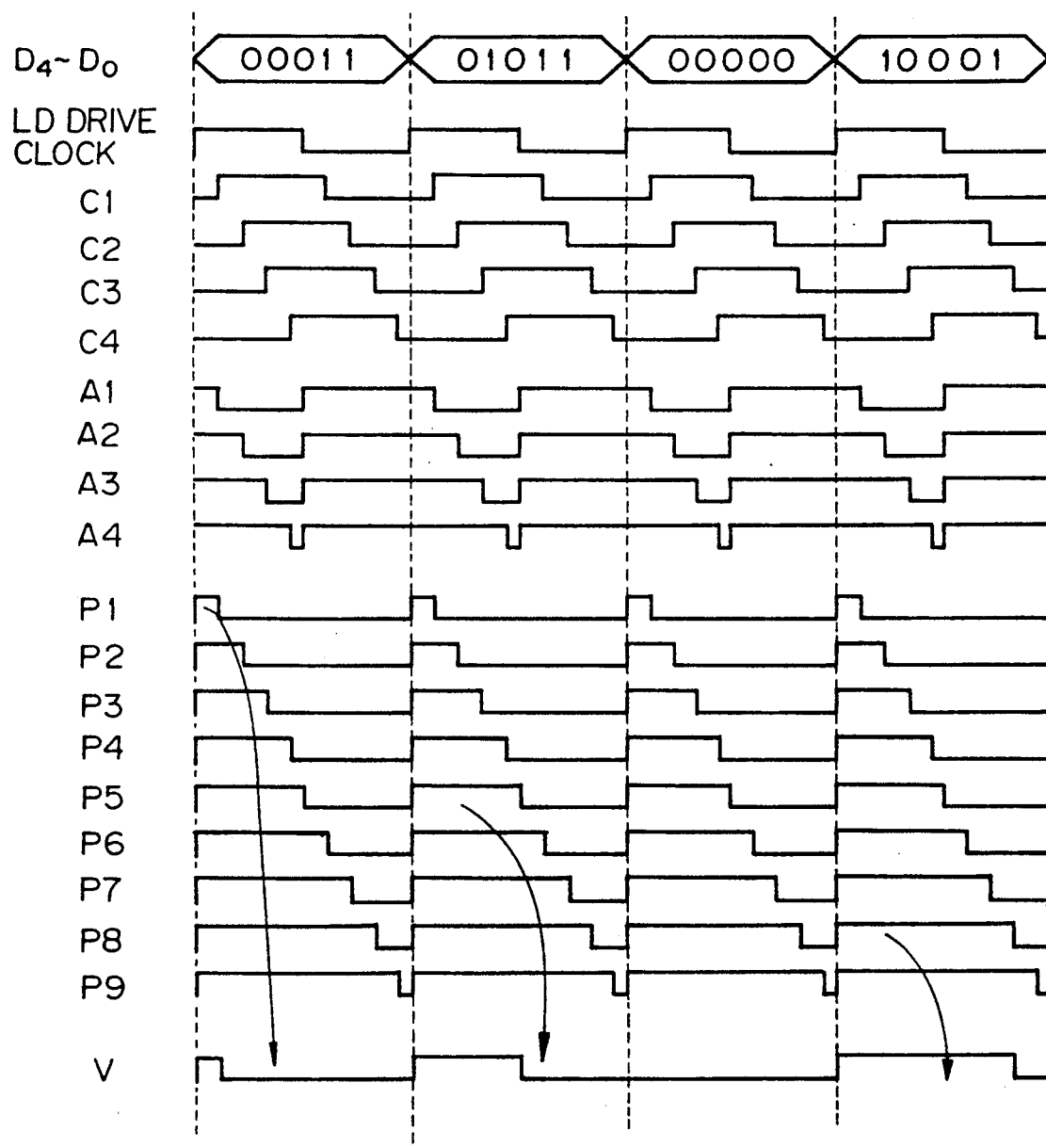

As shown in FIG. 26A, the driver 305y has a laser ON/OFF circuit 350 for turning the laser diode 304y on and off, a pulse width modulation (PWM) circuit 351 for modulating the pulse width of an LD drive clock by the 5-bit image density data (Y data in this case), and a constant current circuit 352 for feeding a current (LD drive current) Id to the laser ON/OFF circuit 350 for driving the laser diode 304y. FIGS. 26B and 26C show respectively a specific construction of the PWM circuit 351 and a specific operation thereof. As shown, 5-bit data D0, D1, D2, D3 and D4 are applied to a D latch 351a. In response, the D latch 351a selects ten different levels inclusive of ZERO (OFF). The data D0 indicates an OFF state of the laser beam when it is ZERO or an ON state of the laser beam when it is ONE.

Only when the laser beam is in an ON state, the other four bits, i.e., D1, D2, D3 and D4 allow nine different pulse widths to be selected. The adjustment of nine different pulse widths is as follows.

First, the LD drive clock is applied to delay elements 351b, 351c, 351d and 351e to generate four different signals C1, C2, C3 and C4. A NAND gate 351i NANDs the LC drive clock and the signal C1 to produce a signal A1, and then an AND gate 351m ANDs the signal A1 and the LC drive clock to produce a signal P1 whose duty is about 1/9. In the same manner, signals P2, P3 and P4 having duties of about 2/9, 3/9 and 4/9, respectively are produced from the LD drive clock and the signals C2, C3 and C4. An OR gate 351q ORs the LD drive clock and the signal C1 to produce a signal P6 having a duty of about 11/18. Likewise, signals P7, P8 and P9 having duties of about 13/18, 15/18 and 17/18, respectively, are produced from the LD drive clock and the signals C2, c3 and C4. On the other hand, an OR gate 351f ORs the LD drive clock and the signal C2 to produce a signal P3 whose duty is bout 90%. The LD drive clock itself is delivered as a signal P5 whose duty is about 50%. These signals P1 to P9 are applied to a data selector 351g which then selects one of them in response to the image density data D1, D2, D3 and D4. An AND gate 351h outputs the signal Pn (n=0 to 3) as an LD drive clock V undergone pulse width modulation only when the data D0 is ONE.

Figure 26D:
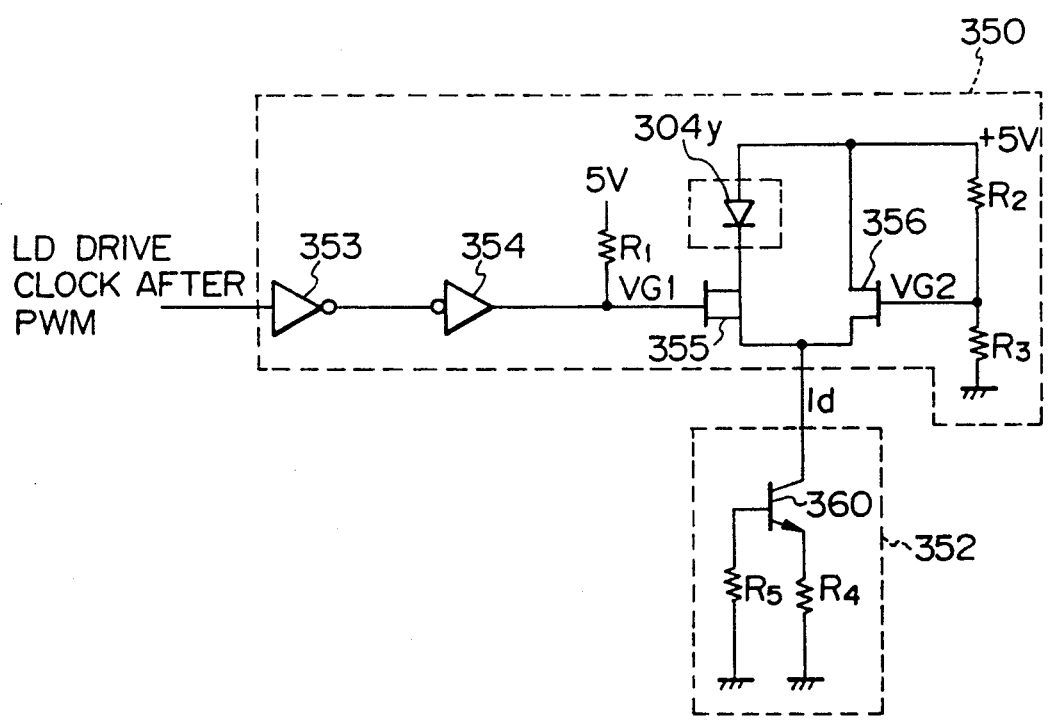

FIG. 26D shows a specific construction of the laser ON/OFF circuit 350 and constant current circuit 352. As shown, the laser ON/OFF circuit 350 has TTL inverters 353 and 354, differential switching circuits 355 and 356 operable in a toggle fashion, and resistors $R_2$ and $R_3$ constituting a voltage dividing circuit. This voltage dividing circuit generates a voltage VG2 which causes, when VG1>VG2, the switching circuits 355 and 356 into, respectively, an ON state and an OFF state and causes, when VG1<VG2, the switching circuits 355 and 356 into, respectively, an OFF state and an ON state. Hence, when the LD drive clock is in an ON state, the incerter 354 generates VG1 and thereby satisfies the condition VG1>VG2. As a result, the switching circuits 35 and 356 become ON and OFF, respectively, and thereby turn on the laser diode 304y. Conversely, when the LD drive clock is in an OFF state, the inverter 354 does not produce an output and thereby satisfies the condition VG1<VG2. Then, the switching circuits 355 and 356 are respectively caused into an OFF state and an ON state to in turn turn off the laser diode 304y. The constant current sure 352 has a transistor 360 and resistors $R_4$ and $R_5$ and feeds a laser drive current to the laser ON/OFF circuit 350, as stated earlier.

Figure 27:
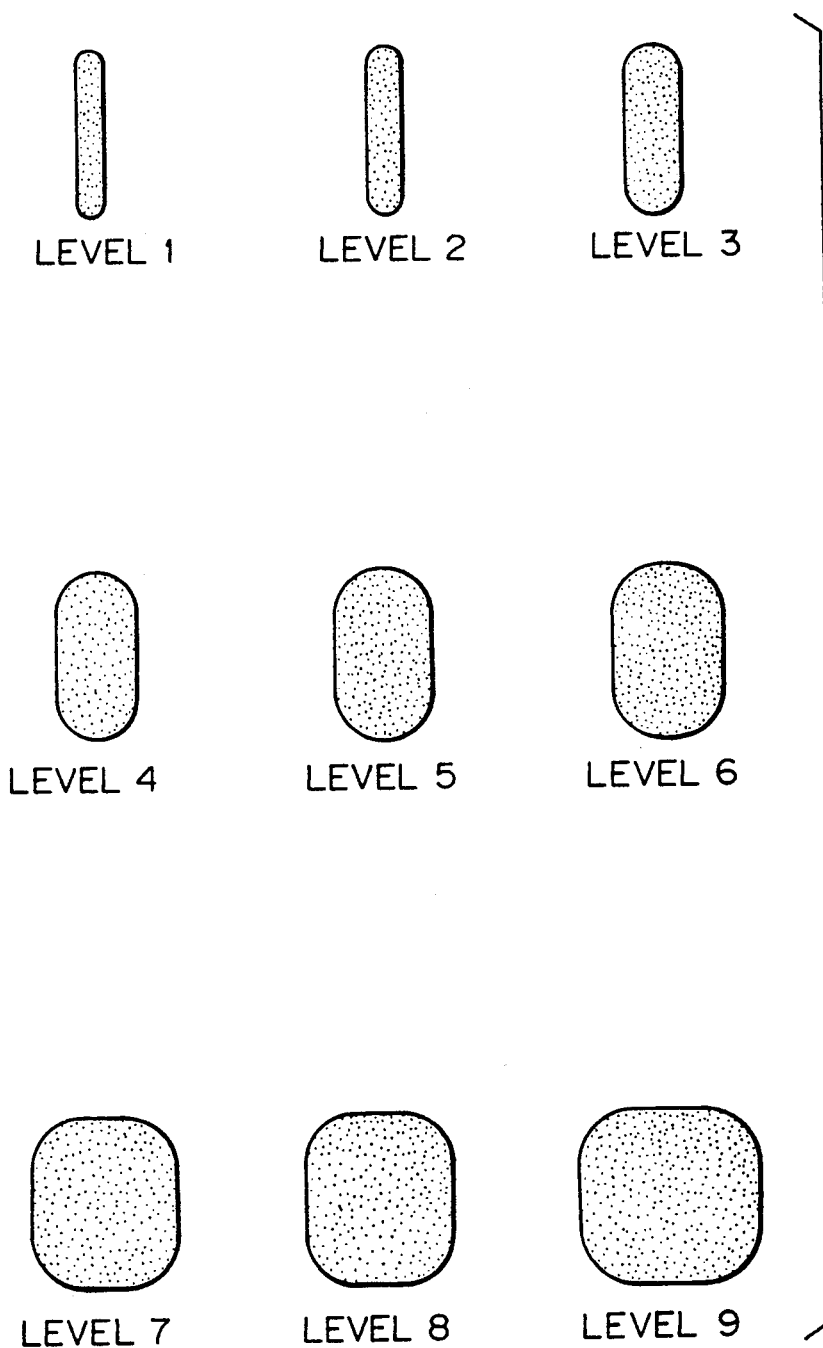
FIG. 27 shows various latent images each being associated with a particular pulse width modulation level.

FIG. 27 shows specific latent images which the laser beam from the laser diode 304y may form on the drum 312y on the basis of levels "0" to "9" (corresponding to tones "0" to "9"). Level "0" is not shown in the figure since it is representative of the absence of a dot.

Figure 28:
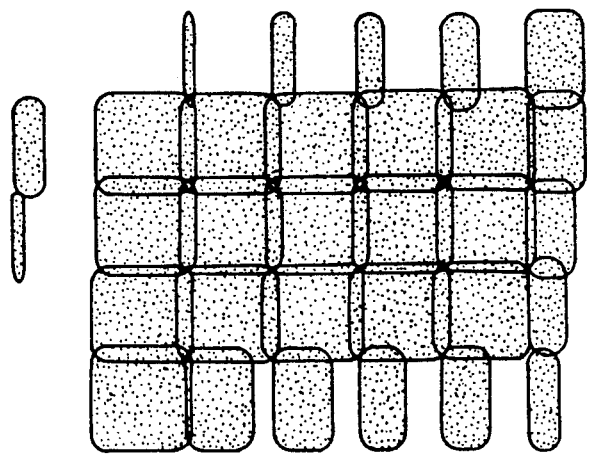
FIG. 28 shows a toner image representative of a square ABCD shown in FIG. 20A.

FIG. 28 shows a toner image which Embodiment 2 forms on a paper sheet in response to the rectangle ABCD shown in FIG. 20A.

Embodiment 3

An image forming system with a PDL controller will be described as a third embodiment of the present invention in relation to the antialias processing. The rest of the construction and operation of Embodiment 3 is the same as Embodiment 2.

This embodiment gives consideration to the characteristic of an electrophotographic process that an image outputted by a laser printer has darker pixels at a right edge than at a left edge. The image processing device or PDL controller, therefore, transforms, when an edge pixel is divided into right and left portions, the area of the right portion into a tone by a greater contribution ratio than the area of the left portion.

The antialias processing particular to this embodiment will be described with reference to FIGS. 29A to 29D.

Figure 29A:
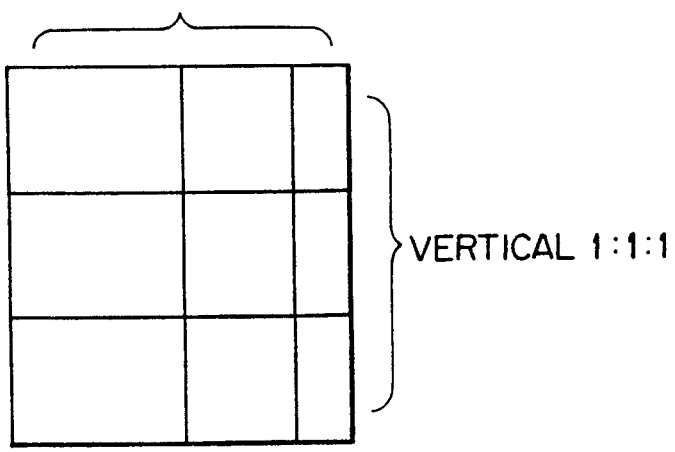
FIGS. 29A to 29D show antialiasing particular to a third embodiment of the present invention.
Figure 29B:
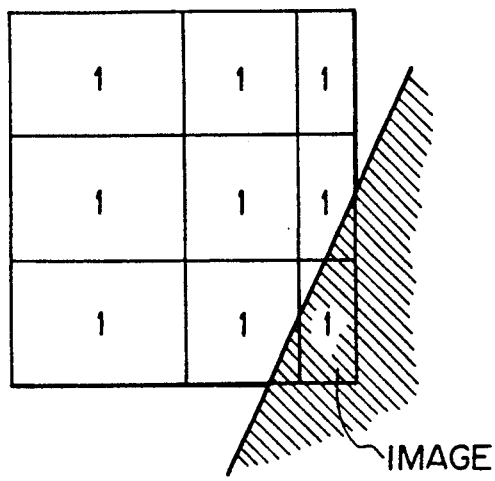
Figure 29C:
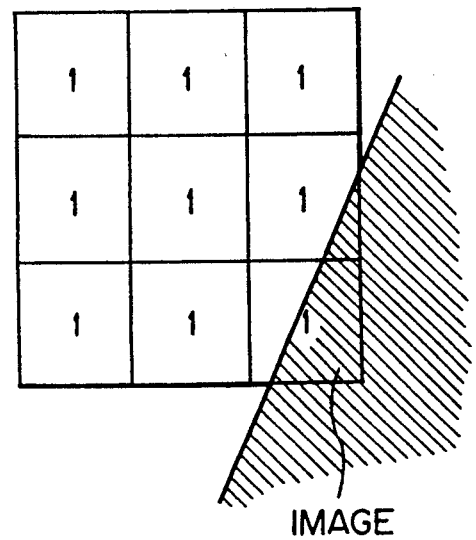

For the above-stated purpose, the illustrative embodiment uses subpixels which are divided by a predetermined radio such that one of two nearby subpixels which is positioned at the right-hand side is always smaller than the other located at the left-hand side. Specifically, as shown in FIG. 29A, a pixel is divided into subpixels in the horizontal direction by a ratio of 3:2:1 from the right to the left. While the embodiment is described as adopting the 3*3 submatrix, it is of course practicable with any other submatrix. In addition, the specific division ratio shown in FIG. 29A is only illustrative. FIG. 29A shows the 3*3 subpixel division, i.e., the case wherein, assuming that the output unit (here laser printer) produces ten different tones ("0" to "9"), the area to be painted or image area is transformed into a tone. These subpixels are provided with the same weight, i.e., "1" with no regard to the size thereof, as shown in FIG. 29B. Hence, when the left portion of a vector image is to be drawn, i.e., when the edge pixel is located at the left-hand side, the propability that the subpixels join the image at the right portion of the pixel increases. As a result, the density tends to increase in the edge pixel located at the left edge. Conversely, when the right portion of a vector image is to be drawn, i.e., when the edge pixel is located at the right-hand side, the probability that the subpixels join the image at the left portion of the pixel decreases. As a result, the density tends to decrease in the edge pixel located at the right edge. Assume that a vector image covers a specific area of an edge pixel, as shown in FIG. 29B. Then, the vector image involves three subpixels and, therefore, the tone is 3/9 or "3". By contrast, when use is made of the conventional 3 * 3 submatrix having a horizontal division ratio of 1:1:1, as shown in FIG. 29C, the image involves two subpixels and, therefore, the tone is 2/9 or "2".

Figure 29D:
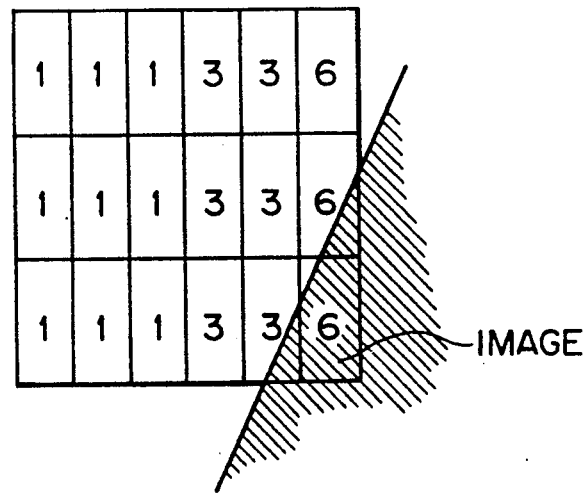

When a vector image covers the left portion of an edge pixel, the subpixel division shown in FIG. 29B will result in a lower tone than the subpixel division of FIG. 29A, although not described specifically. It follows that the subpixel division of FIG. 29A allows, when an edge pixel is divided in the right-and-left direction, the area of the right portion to be transformed into a tone by a greater contribution ratio than the area of the left portion. Despite such a particular weighting scheme, tones can be determined as rapidly as in the conventional averaging scheme. FIG. 29D shows an alternative implementation for tranforming the area of the right portion of an edge pixel into a tone by a greater contribution ratio than the area of the left portion. Specifically, in FIG. 29D, the edge pixel is divided into six subpixels in the horizontal direction and three subpixels in the vertical direction, and tones are determined by use of a weighted filter, i.e., by the weighted averaging scheme. The weighted matrix of FIG. 29D is as advantageous as the matrix of FIG. 29B (tone 3/9 or "3"). However, the matrix of FIG. 29D needs multiplication for weighting and, therefore, somewhat slower in processing rate than the matrix of FIG. 29A.

Figure 30A:
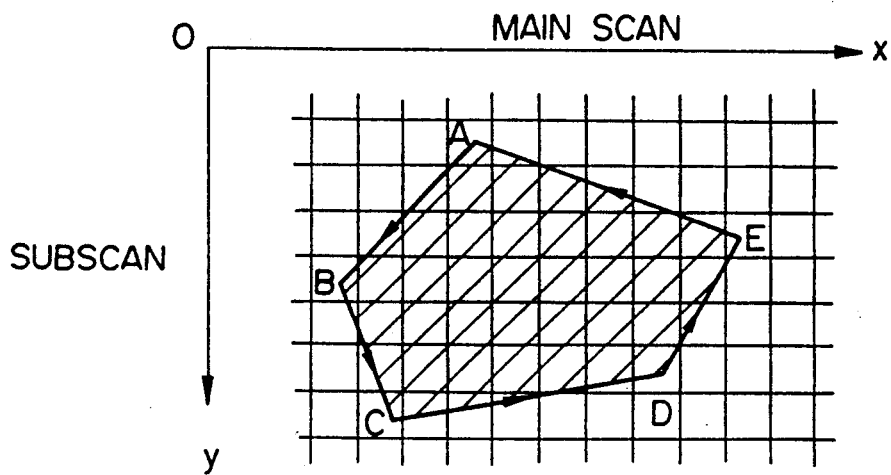
FIGS. 30A and 30B show the divsion of a figure into line vectors.
Figure 30B:
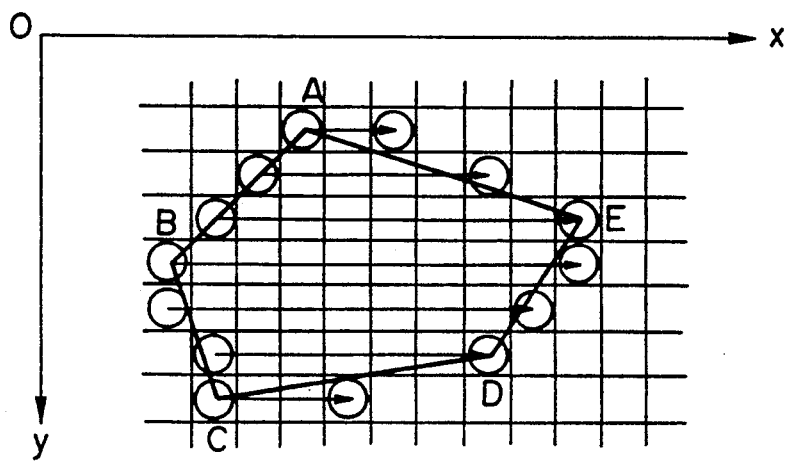

Assume that a pentagon ABCDE shown in FIG. 30A is inputted. This pentagon has the following elements:

(a) five line vectors AB, BC, CD, DE and EA (real number notation)

(b) colors and luminances in the figure

By the procedure stated earlier, the pentagon ABCDE is divided into seven line vectors (real number notation) extending in the main scanning direction. In this embodiment, the following data is added to the start and end points of each of the seven line vectors:

(c) coordinates of the start point of vector elements (above-mentioned (a)) defining the start and end point of a line vector (d) inclination of vector elements defining the start and end points of a line vector (e) features of the start and end points of a line vector (right and left edges, apexes, line thinner than one dot, crossing points of lines, etc).

Figure 31:
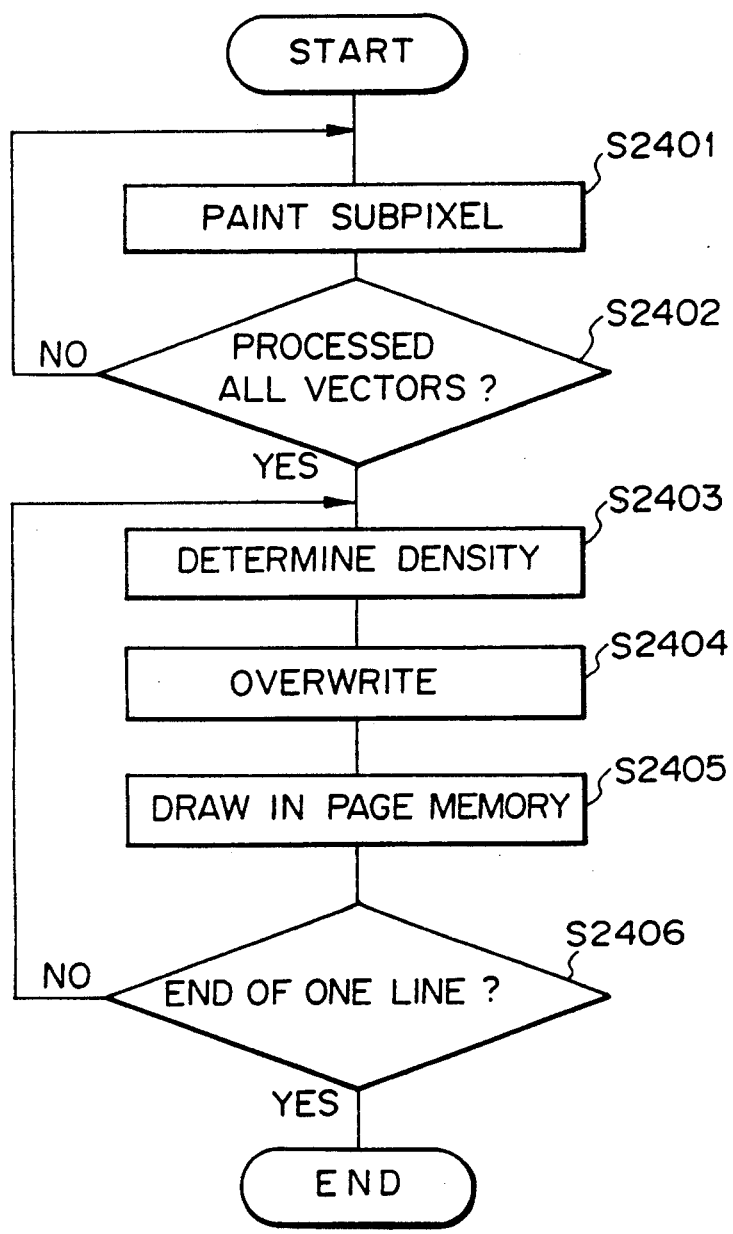
FIG. 31 is a flowchart demonstrating antialiasing particular to the third embodiment.

A reference will be made to FIG. 31 for describing antialiasing which is included in the processing for painting one-pixel scanning line.

As shown in FIGS. 29 to 29D, the illustrative embodiment transforms the area of the right portion of a bisected edge pixel into a tone by a greater contribution ratio than the area of the left portion. First, one pixel is divided into 3 * 3 subpixels by the horizontal division ratio of FIG. 29A so as to determine subpixels which should be painted (S2401). This operation is repeated with all of the vectors which cross the scanning line (S2402). Subsequently, the tones (densities) of the individual pixels on the scanning line of interest are determined by use of a filter which implements the uniform averaging scheme (antialias processing) (S2403). This is followed by the calculation of tones (densities) of individual colors (BK, R, G and B) implemented by overwriting, althoug not described specifically (S2404). Thereafter, the tones of the individual colors are written to the page memory (S2405). The steps S2403 to 2405 are repeated with all of the one line of pixels (S2406).

The CPU 202 executes the above-stated iterative sequence to the last pixel of the scanning lines (y coordiate) while updating the content (c) by the data (d). As a result of such antialias processing, the tones k of the figure shown in FIG. 30A have specific values shown in FIG. 32. The tones k are developed into BK, Y, M and C image data by predetermined Y, M, C and BK transform processing on the basis of the previously mentioned colors and luminances (data (b)) and then written to the associated plan memory sections of the page memory 206 as image data. FIGS. 33A to 33D show respectively BK data, C data, M data and Y data produced by a relation C:M:Y = 1:0.5:0.3 and 100% UCR.

Figure 34:
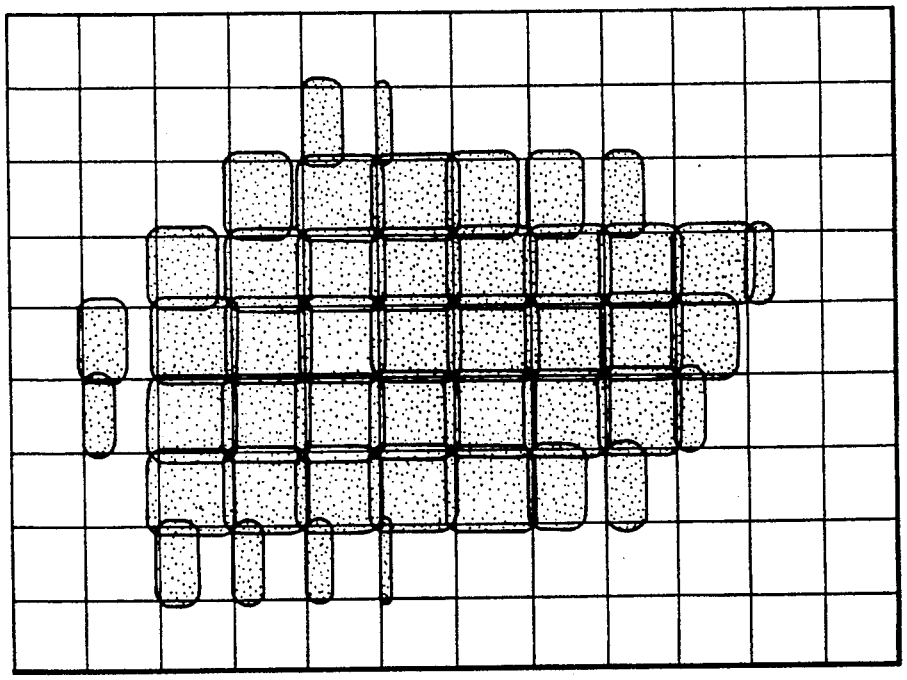
FIG. 34 shows a toner image representative of a pentagon ABCDE shown in FIG. 30A.
Figure 35:
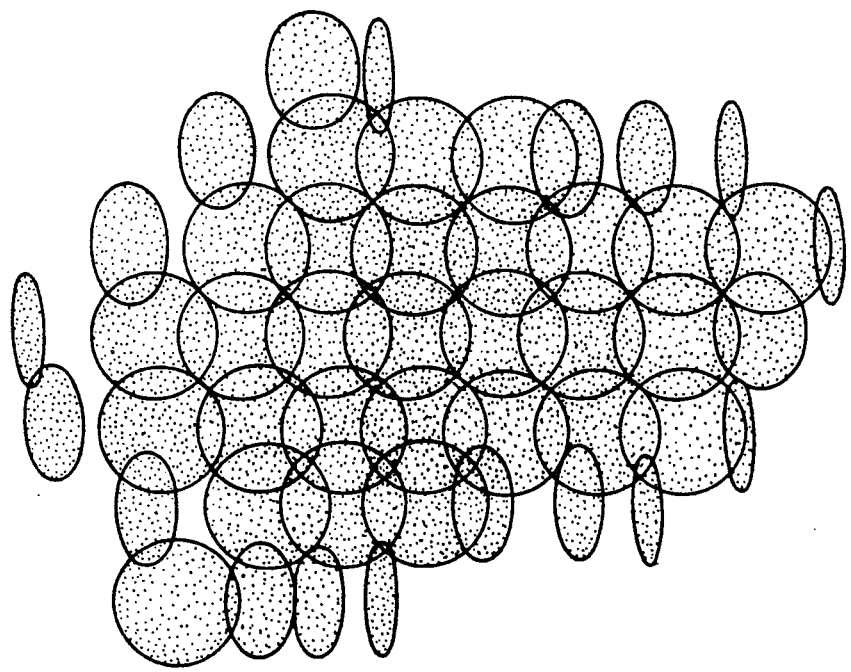
FIG. 35 shows a toner image representative of the pentagon ABDCE and produced by the conventional subpixel division.

By the construction and operation described above, the illustrative embodiment forms a toner image shown in FIG. 34 on a paper sheet in response to the pentagon ABCDE shown in FIG. 30A. When use is made of the 1:1:1 subpixel division, the pentagon ABCDE will be turn into a toner image shown in FIG. 35. By comparing FIG. 34 (toner image of the embodiment) with FIG. 35, it will be seen that the embodiment is capable of forming a toner image while making most of the advantage of the anteialias processing. In practice, since low-density edges of a toner image cannot be surely reproduced due to the characteristic (defect) of the electrophotographic process, the advantage of this embodiment will be further significant in an image undergone development and transfer. Of course, the weighted filter shown in FIG. 29D is as advantageous as the transforming the area of the right portion by a greater contribution ratio than the left portion.

Embodiment 4

An image forming system with a PDL controller will be described as a fourth embodiment of the present invention in relation to the antialias processing. The rest of the construction and operation of Embodiment 4 is the same as Embodiment 2.

This embodiment divides a single pixel into a region for dividing the pixel into subpixels and a region for not dividing it into subpixels and, based on the number of subpixels covered by an image, determines a tone. This is successful in setting tone "0" for edge pixels which are apt to adversely affect the antialias processing and thereby produce alias due to the characteristic of the pulse width modulation system.

Figure 36A:
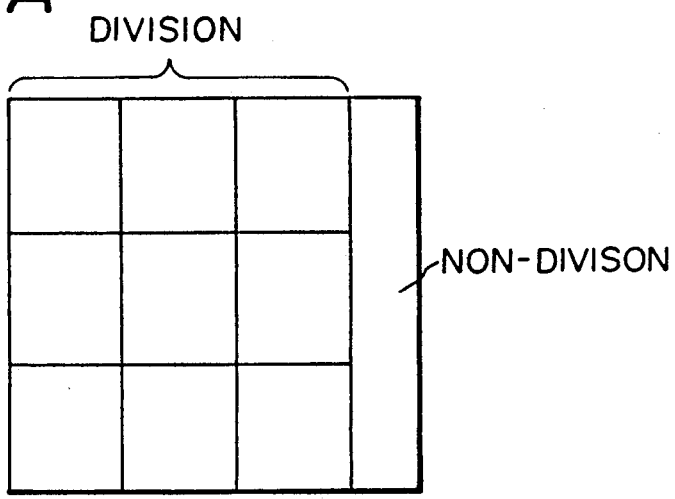
FIGS. 36A to 36E show antialiasing particular to a fourth embodiment of the present invention.
Figure 36B:
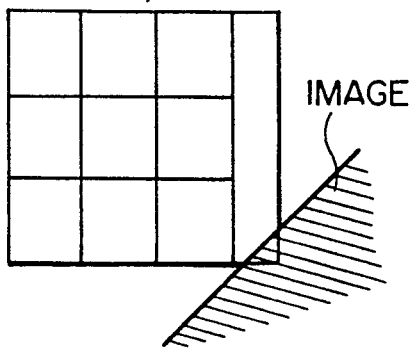
Figure 36C:
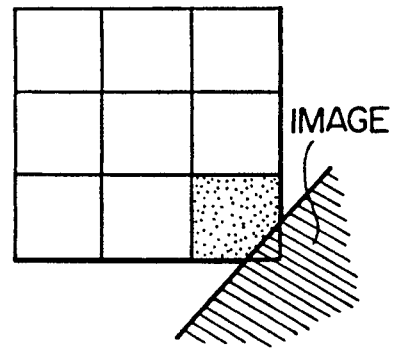
Figure 36D:
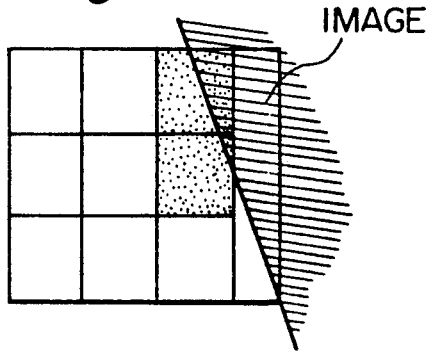
Figure 36E:
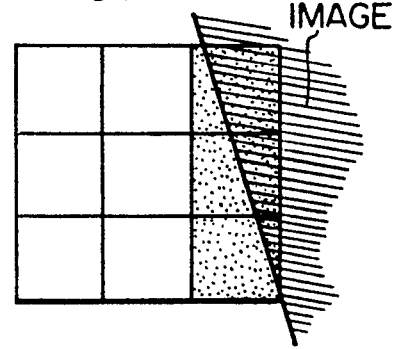

The antialias processing particular to this embodiment will be described with reference to FIGS. 36A to 36E. As shown in FIG. 36A, this embodiment divides a pixel (to be subjected to antialias processing) into a left or division region to be divided into subpixels and a right or non-division region not to be done so. The division region is divided into 3 * 3 subpixels. How the embodiment determines a tone will be described in comparison with the conventional 3 * 3 division scheme with reference to FIGS. 36A to 36E. As shown in FIG. 36B, when an image exists in the non-division region of the pixel and not in the subpixels, the number of subpixels to be painted is 0/9 and, therefore, the tone is "0". By contrast, as shown in FIG. 36C, the number of pixels to be pained according to the conventional 3 * 3 division scheme is 1/9, resulting in tone "1". When a dot is formed by pulse width modulation on the basis of tone "1", the dot will be isolated from the image to render antialias processing useless since the image overlaps the pixel only slightly. As shown in FIG. 36D, assume that an image overlaps the division region of the pixel. Then, the number of subpixels to be painted is 2/9 and, therefore, the tone is "2". By contrast, as shown in FIG. 36E, the conventional 3 * 3 division scheme would determine that 3/9 subpixels should be painted and, therefore, that the tone is "3". Although the tone determined by the embodiment is slightly smaller than the tone resulted from the conventional scheme, the advantage of antialias processing is preserved since all the pixels of the left edge are provided with comparatively low tones when viewed in the subscanning direction. Moreover, since use is not made of a weighting filter, multiplication for weighting is not necessary and, therefore, the processing speed is as high as the processing speed of the ordinary uniform averaging scheme.

Figure 37:
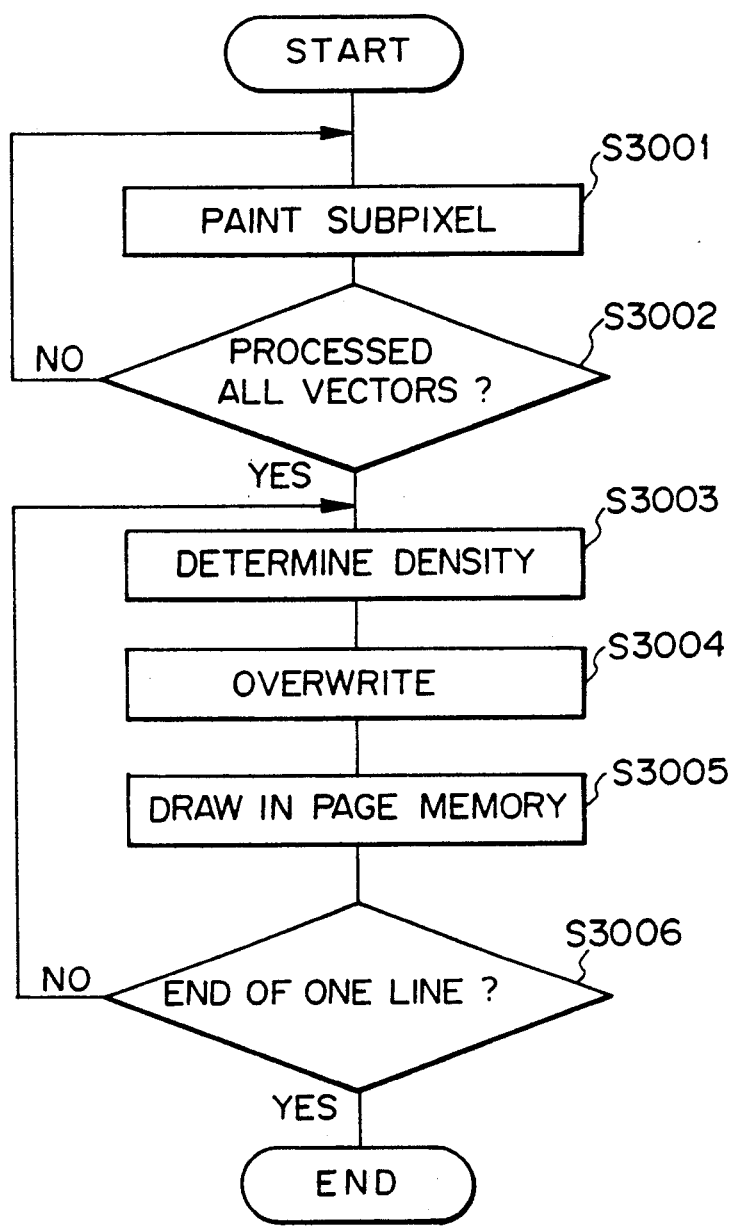
FIG. 37 is a flowchart demonstrating the processing of the fourth embodiment more specifically.

A reference will be made to FIG. 37 for describing antialiasing which is included in the processing for painting one-pixel scanning line. As shown in FIGS. 36A to 36E, the illustrative embodiment transforms the area of the right portion of a bisected edge pixel into a tone by a greater contribution ratio than the area of the left portion.

First, one pixel is divided into a division region and a non-division region, and the division region is subdivided into 3 * 3 subpixels so as to determine the region to be painted subpixel by subpixel (S3001). This operation is repeated with all of the vectors which cross the scanning line (S3002). Subsequently, the tones (densities) of the individual pixels on the scanning line of interest are determined by use of a filter which implements the uniform averaging scheme, the first pixel being first (antialias processing) (S3003). This is followed by the calculation of tones (densities) of individual colors (BK, R, G and B) implemented by overwriting, although not described specifically (S3004). Thereafter, the tones of the individual colors are written to the page memory (S3005). The steps S3003 to S3005 are repeated with all of the one line of pixels (S3006).

The CPU 202 executes the above-stated iterative sequence to the last pixel of the scanning lines (y coordinate) while updating the content (c) by the data (d) (see Embodiment 3). As a result of such antealias processing, the tones k of the figure shown in FIG. 30A, for example, have specific values shown in FIG. 38. The tones k are developed into BK, Y, M and C image data by predetermined Y, M, C and BK transform processing on the basis of the previously mentioned colors and luminances (data (b)) and then written to the associated plan memory sections of the page memory 206 as image data. FIGS. 39A to 39D show respectively BK data, C data, M data and Y data produced by a relation C:M:Y=1:0.5:0.3 and 100% UCR.

Figure 40:
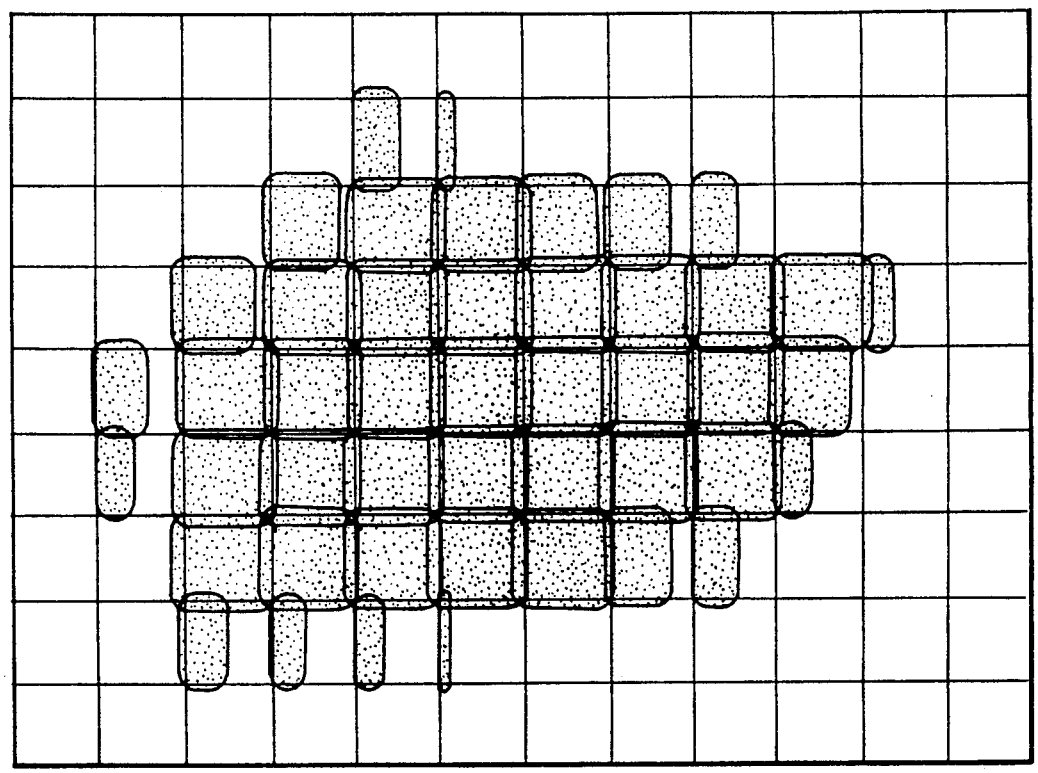
FIG. 40 shows a toner image representative of the pentagon ABCDE shown in FIG. 30A.

By the construction and operation described above, the illustrative embodiment forms a toner image shown in FIG. 40 on a paper sheet in response to the pentagon ABCDE shown in FIG. 30A. By comparing FIG. 40 (toner image of the embodiment) with FIG. 35, it will be seen that the embodiment is capable of forming a toner image while making most of the advantage of the anteialias processing. While this embodiment has been shown and described as subdividing the division region into 3 * 3 subpixels, such a subpixel submatrix is only illustrative. Further, the the ratio of the non-division region to the division region may be increased, if desired.

Embodiment 5

An image forming system with a PDL controller will be described as a fifth embodiment of the present invention in relation to the antialias processing. The rest of the construction and operation of Embodiment 5 is the same as Embodiment 2.

In this embodiment, the image processing device or PDL controller determines, on the basis of the inclination of vector data traversing an edge pixel and the kind of the edge, which of an upper, lower, right and left portions of the pixel an image occupies. Then, based on the result of decision, the PDL controller selects one of predetermined weighting filters to determine a tone of the edge pixel. The tones so determined by optimal weighting filters allow an image to be outputted in an adequate tone distribution. Especially, this embodiment frees a left-edge pixel whose right portion should be painted from alias ascribable to a low-density dot which would otherwise result from the characteristic of pulse width modulation.

A reference will be made to FIGS. 41A to 41F for describing antialiasing particular to this embodiment.

In the illustrative embodiment, use is made of four weighting filters each having a 4 * 4 matrix and having particular weights for averaging which are different from the weights of the others. The tone of the edge pixel produced by the weighting filter is transformed into any one of ten successive tones to be applied to the pulse width modulation type multi-color laser printer 300 operable with ten successive tones. Specifically, FIGS. 41A to 41D show four weighting filters with which the embodiment is practicable. The filter shown in FIG. 41A is used when an image portion to be painted is located in a left portion of an edge pixel. The filter shown in FIG. 41B is used when such an image portion is located in a right portion of an edge pixel. The filters shown in FIGS. 41C and 41D are respectively used when the image portion is located in a lower portion and an upper portion of an edge pixel. It should be noted that the weights assigned to the individual filters are only illustrative and may be replaced with any other weights so long as they eliminate jagged edges in a print in conformity to the number of tones, dot configuration and other factors particular to a laser printer.

FIG. 41E lists specific conditions for determining the position of an image portion in an edge pixel on the basis of the inclination of vector data and the kind of an edge. For example, when the inclination $\alpha$ of vector data is $\pi/2$ and the kind an edge is a right edge, it is determined that a left portion of the edge pixel should be painted. Then, the weighting filter shown in 41A is used.

In the embodiment, whether or not the position of an image portion to be painted should be discriminated in the up-and-down direction or in the right-and-left direction is determined depending on whether the inclination $\alpha$ of vector data is greater than or smaller than $\pi/4$ (or $-\pi/4$). Of course, a reference inclination other than $\pi/4$ may be used.

Figure 41F:
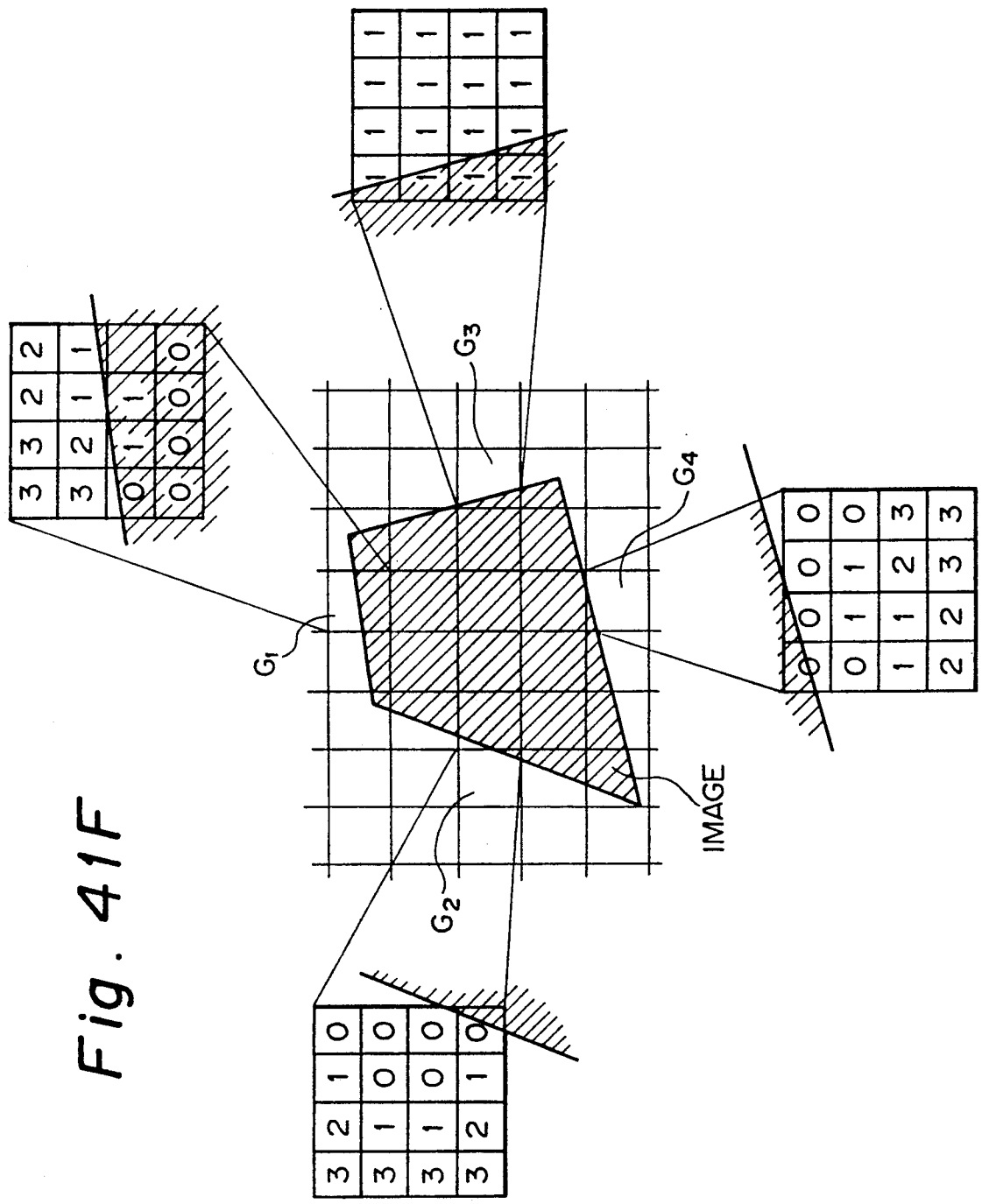

Referring to FIG. 41F, how the weighting filters are used will be described specifically. In the figure, a pixel $G_1$ has an inclination $\alpha$ equal to or greater than 0 and smaller than $\pi/4$ and a left edge, so that it is determined that a lower portion thereof should be painted. Hence, the filter shown in FIG. 41C is used; the resultant tone is "4 (4/19)". A pixel $G_2$ has an inclination $\alpha$ greater than $\pi/4$ and a left edge, so that it is determined that a right portion thereof should be painted. In this case, the filter shown in FIG. 41B is used; the resultant tone is "0 (0/19)". A pixel $G_3$ has an inclination $\alpha$ smaller than $-\pi/4$ and a left edge. Then, it is determined a left portion of the pixel $G_3$ should be painted; use is made of the filter shown in FIG. 41A, and the resultant tone is "6 (6/16)". Further, a pixel $G_4$ has an angle $\alpha$ equal to or greater than 0 and smaller than $\pi/4$ and a right edge, so that it is determined that an upper portion thereof should be painted. Then, the filter shown in FIG. 41D is used, resulting in a tone "0 (0/20)".

Figure 42:
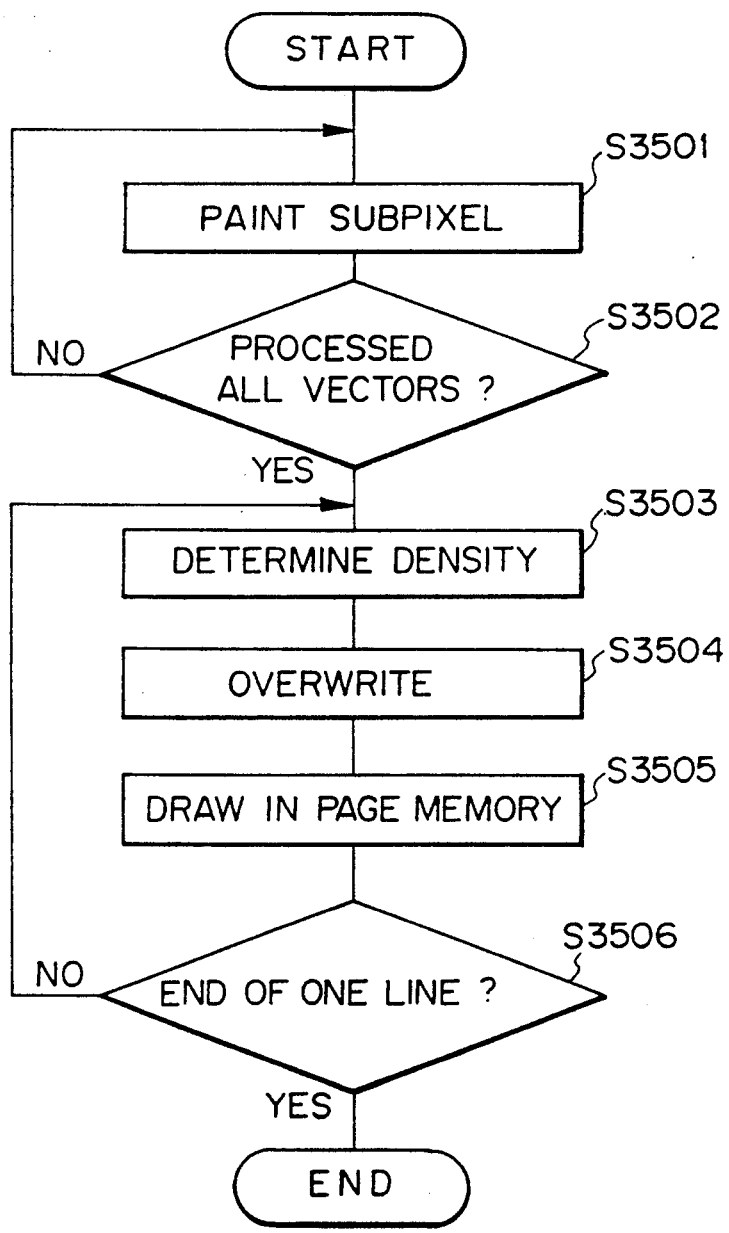
FIG. 42 is a flowchart demonstrating the antialiasing of the fifth embodiment more specifically.

A reference will be made to FIG. 42 for describing antialiasing included in the painting procedure particular to the illustrative embodiment.

First, subpixel painting procedure is executed to divide one pixel into 4 * 4 subpixels to determine a region to be painted subpixel by subpixel (S3501). This operation is repeated with all of the vectors which traverse the scanning line (S3502). Subsequently, in a density determining procedure, which of upper, lower, right and left portions of an edge pixel an image portion occupies is determined on the basis of the inclination of vector data traversing the pixel and the kind of an edge, as shown in FIG. 41E. Then, a particular filter matching the result of decision is selected to calculate the tones (densities) of the individual pixels on the scanning line of interest by weighted averaging, the first pixel being first (S3503). This is followed by the calculation of tones (densities) of individual colors (BK, R, G and B) implemented by overwriting, although not described specifically (S3504). Thereafter, the tones of the individual colors are written to the page memory (S3505). The steps S3503 to S3505 are repeated with all of the one line of pixels (S3506).

The CPU 202 executes the above-stated iterative sequence to the last pixel of the scanning lines (y coordinate) while updating the content (c) by the data (d) (see Embodiment 3). As a result of such antealias processing, the tones k of the figure shown in FIG. 30A, for example, have specific values shown in FIG. 43. The tones k are developed into BK, Y, M and C image data by predetermined YMC and BK transform processing on the basis of the previously mentioned colors and luminances (data (b)) and then written to the associated plan memory sections of the page memory 206 as image data. FIGS. 44A to 44D show respectively BK data, C data, M data and Y data produced by a relation C:M:Y=1:05:0.3 and 100% UCR.

Figure 45:
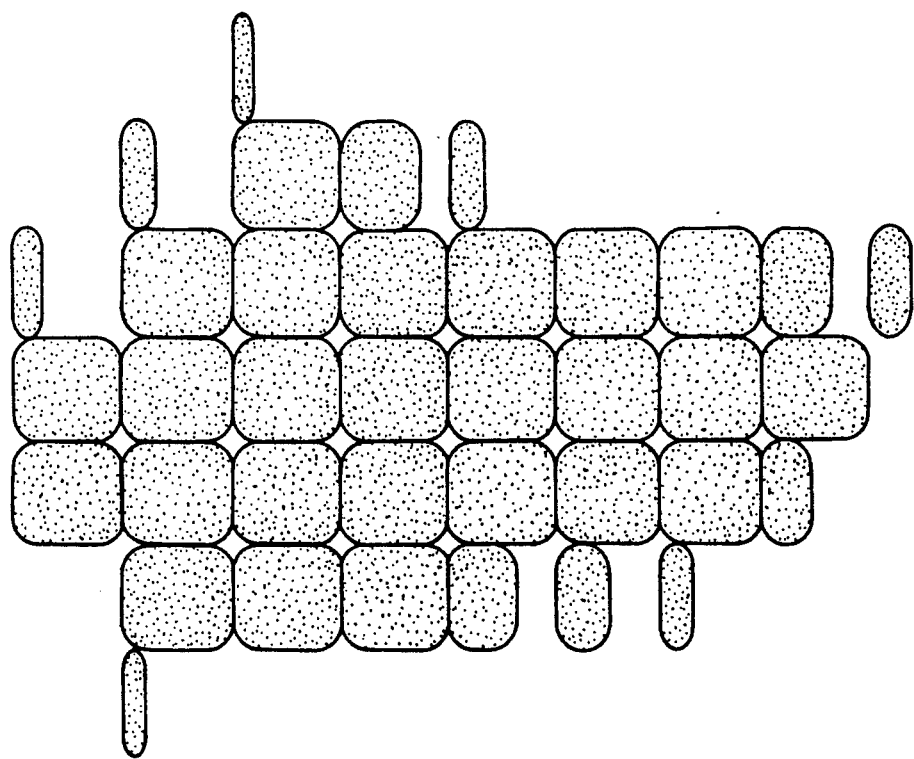
FIG. 45 shows a toner image representative of the pentagon ABCDE shown in FIG. 30A.

By the construction and operation described above, the illustrative embodiment forms a toner image shown in FIG. 45 on a paper sheet in response to the pentagon ABCDE shown in FIG. 30A. As FIG. 45 indicates, this embodiment is capable of forming a toner image while insuring the advantage of antialiasing.

In summary, it will be seen that graphics processing apparatus of the present invention has various unprecedented advantages, as enumerated below.

(1) Antialiasing advantageous over conventional antialiasing schemes is achievable.

(2) A tone not noticeably different from a tone produced from an actual area ratio is attained without any decrease in the processing rate.

(3) The advantage of antialiasing is preserved with consideration given to the characteristic of an electrophotographic process.

(4) Low-density dots particular to pulse width modulation are prevented from adversely affecting antialias processing without any decrease in the processing rate.

Various modifications will become possible for those skilled in the art after receiving the teachings of the present disclosure without departing from the scope thereof.

What is claimed is:

1. A graphic data processing apparatus for producing a tone of an edge pixel of vector data in a manner to reduce aliasing effects, the apparatus comprising:
   a) dividing means for dividing an edge pixel of vector data into subpixels by using a way of dividing;
   b) varying means for varying the way of dividing the edge pixel, in matching relation to an inclination of the vector data; and
   c) determining means, including:
      1) means for calculating an area ratio by using the subpixels; and
      2) means for determining the tone of the edge pixel based on the area ratio.

2. An apparatus as claimed in claim 1, wherein the tone comprises density.

3. An apparatus as claimed in claim 1, wherein the tone is fed to an output unit.

4. An apparatus as claimed in claim 3, wherein said output unit comprises a multi-level output unit.

5. An apparatus as claimed in claim 3, wherein said output unit comprises a laser printer.

6. An apparatus as claimed in claim 1, wherein:
   said varying means includes means for varying a configuration in which said dividing means divides the edge pixel on the basis of feature data particular to the vector data.

7. The apparatus of claim 1, wherein the varying means includes:
   means for varying a size of the subpixels.

8. The apparatus of claim 1, wherein the varying means includes:

means for varying a shape of the subpixels.

9. The apparatus of claim 1, wherein the varying means includes:

means for varying an orientation of the subpixels.

10. A graphic data processing apparatus for determining a tone of an edge pixel of vector data, the apparatus comprising:

means for selecting, among a plurality of subpixel configurations, a particular subpixel configuration on the basis of whether or not a marginal point exists in said edge pixel;

means for dividing the edge pixel into subpixels in the particular subpixel configuration selected by said selecting means; and means for outputting the tone based on a division of the edge pixel based on the particular subpixel configuration.

11. An apparatus as claimed in claim 10, wherein said plurality of pixel configurations include:

a quadrilateral formed by dividing an edge pixel into 1 * N subpixels, a quadrilateral formed by dividing an edge pixel into N * 1 subpixels, and a quadrilateral formed by dividing an edge pixel into N * M subpixels.

12. A graphic data processing apparatus for producing a tone of an edge pixel of vector data, comprising:

a) dividing means for dividing an edge pixel into subpixels; and b) tone determining means including:

1) means for dividing said edge pixel into (i) a division region which is to be divided into subpixels and (ii) a non-division region which is not to be divided into subpixels; and 2) means for determining the tone on the basis of the number of subpixels of said division region which are covered by an image.

13. A graphic data processing apparatus for producing a tone of an edge pixel of vector data, comprising:

a) dividing means for dividing an edge pixel of vector data into subpixels;

b) deciding means for determining a decision result, on the basis of (1) an inclination of vector data traversing an edge pixel and (2) the kind of an edge, the decision result constituting a decision as to which of upper, lower, left and right portions of said edge pixel an image to be painted is positioned;

c) storing means for storing a first, a second, a third and a fourth weighing filter to be used when said image to be painted is positioned in said upper portion, said lower portion, said right portion, and said left portion of said edge pixel, respectively; and d) tone determining means for determining the tone of said edge pixel by selecting, one of said first to fourth weighting filters matching said decision result.

* * * * *